(12) United States Patent
Hoover et al.

(10) Patent No.: US 9,600,779 B2
(45) Date of Patent: Mar. 21, 2017

(54) MACHINE LEARNING CLASSIFIER THAT CAN DETERMINE CLASSIFICATIONS OF HIGH-RISK ITEMS

(71) Applicant: Accenture Global Solutions Limited, Dublin (IE)

(72) Inventors: James Hoover, Mechanicsburg, PA (US); Jeffrey Scott Miller, Fairfax Station, VA (US); Lisa Wester, Alexandria, VA (US); Randall C. Gowat, Arlington, VA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/014,773

(22) Filed: Feb. 3, 2016

(65) Prior Publication Data
US 2016/0155069 A1 Jun. 2, 2016

Related U.S. Application Data

(63) Continuation-in-part of application No. 13/491,146, filed on Jun. 7, 2012, and a continuation-in-part of
(Continued)

(51) Int. Cl.
*G06F 15/18* (2006.01)
*G06N 99/00* (2010.01)
(Continued)

(52) U.S. Cl.
CPC ......... *G06N 99/005* (2013.01); *G06F 3/0481* (2013.01); *G06F 17/30294* (2013.01);
(Continued)

(58) Field of Classification Search
CPC ........................................................ G06Q 30/08
(Continued)

(56) References Cited

U.S. PATENT DOCUMENTS

| | | | |
|---|---|---|---|
| 6,937,994 B1 * | 8/2005 | Iyengar | G06Q 30/02 705/7.29 |
| 7,272,579 B1 * | 9/2007 | Canali | G06Q 30/08 705/37 |

(Continued)

OTHER PUBLICATIONS

Akira Ikeda, "A Study of Institutional Design on Government Procurement Accompanying Development in Multi-agent Simulation", Information Processing Society of Japan Journal of Information Processing, vol. 49, No. 7 [CD-ROM, Japan, Information Processing Society of Japan, Jul. 15, 2008, vol. 49, pp. 2731-2740, with English abstract.

(Continued)

*Primary Examiner* — David Vincent
(74) *Attorney, Agent, or Firm* — Mannava & Kang, P.C.

(57) ABSTRACT

A machine learning classifier system includes a data set processing subsystem to generate a training set and a validation set from multiple data sources. Classifier hardware induces a classifier according to the training set, and tests the classifier according to the validation set. A buffer connected to the classifier hardware stores data objects to be classified, and a register connected to the classifier hardware stores outputs of the classifier, including classified data objects.

13 Claims, 27 Drawing Sheets

Related U.S. Application Data application No. 14/989,572, filed on Jan. 6, 2016, which is a continuation of application No. 13/491,146, filed on Jun. 7, 2012.

(60) Provisional application No. 61/494,839, filed on Jun. 8, 2011, provisional application No. 61/494,839, filed on Jun. 8, 2011.

(51) Int. Cl.
    *G06Q 30/06*   (2012.01)
    *G06F 3/0481*  (2013.01)
    *G06F 17/30*   (2006.01)
    *G06Q 10/06*   (2012.01)
    *G06N 5/04*    (2006.01)
    *G06Q 30/02*   (2012.01)
    *G06Q 30/08*   (2012.01)

(52) U.S. Cl.
    CPC .. *G06F 17/30401* (2013.01); *G06F 17/30557* (2013.01); *G06F 17/30572* (2013.01); *G06N 5/045* (2013.01); *G06Q 10/067* (2013.01); *G06Q 10/0635* (2013.01); *G06Q 30/0201* (2013.01); *G06Q 30/0206* (2013.01); *G06Q 30/06* (2013.01); *G06Q 30/08* (2013.01)

(58) Field of Classification Search
    USPC .................................................. 706/12, 45
    See application file for complete search history.

(56) References Cited

U.S. PATENT DOCUMENTS

| | | |
|---|---|---|
| 7,747,339 B2 | 6/2010 | Jacobus et al. |
| 7,747,500 B2 | 6/2010 | Hwang |
| 7,870,012 B2 | 1/2011 | Katz et al. |
| 8,725,666 B2* | 5/2014 | Lemmond ......... G06F 17/30684 706/13 |
| 9,053,391 B2* | 6/2015 | Wang .................. G06K 9/6256 |
| 2002/0077867 A1* | 6/2002 | Gittins .................. G06Q 30/02 705/4 |
| 2006/0047598 A1 | 3/2006 | Hansen |
| 2006/0085323 A1* | 4/2006 | Matty .................. G06Q 10/04 705/38 |
| 2008/0249764 A1* | 10/2008 | Huang ............... G06F 17/2785 704/9 |
| 2009/0222297 A1 | 9/2009 | Cao et al. |
| 2011/0246262 A1* | 10/2011 | Pepper .................. G06Q 30/04 705/12 |

OTHER PUBLICATIONS

Taizo Moroyama, "This is How Internet Scam Work! Know about Internet Scams Methods and Take Full Measures Not to be Tricked", PC Japan, vol. 10, No. 10, Japan, SoftBank Publishing Inc., Oct. 1, 2005, vol. 10, pp. 105-110.

English translation of "Notice of Reasons for Refusal", Japan Patent Office search report on patent application No. JP-2012-130531, Jul. 30, 2013.

* cited by examiner

FIG. 13

| RFx | — 🗗 × |
|---|---|
| | demo.com |

Display RFx: 3621401406

| PR | 43569338 | PR Status SQL_SAV | PR Value 440,863.00 | Ext PR | PR Created 3/10/2012 | Buyer HBO PARFEC06 |
| RFx | 4000001249 | RFxPHN SPE4A712R001 | RFx Value 396,776.88 | Closing 5/1/2012 | Rfx Status Saved | Supplier |
| Award | | AWD PHN | AWD Value | AWD Date | AWD Status | Admin |

[ Edit ] [ Close ] [ Refresh ] [ Copy ] [ Check ] [ Export ] [ Print Preview ]

| RFx Information | Bidders | Items | Notes and Attachments | Approval | Tracking |

▼ Bidder Overview

Add Bidder by Company ID [ ] [ Add ] [ Search for Bidders ] [ Send Notifications ] [ Output Medium ] [ Delete ]

| Company Name | Contact | Country | Company | Bidder ID | Phone | Output Medium | HRP Score | Risk Factor |
|---|---|---|---|---|---|---|---|---|
| James Brothers Construction | Default Contact for 0000077445 | US | 77445 | 5000174010 | 8605653696 | XML | 967 | Price |
| Quincy Engineering | Default Contact for 0000065065 | US | 65065 | 5000170736 | 6167457714 | XML | 810 | Supplier |
| F&T Sales & Service | Default Contact for 0000052661 | US | 52661 | 5000164661 | 8605550385 | XML | 930 | Price |

MACHINE LEARNING CLASSIFIER THAT CAN DETERMINE CLASSIFICATIONS OF HIGH-RISK ITEMS

PRIORITY

This patent application is a continuation-in-part of U.S. patent application Ser. No. 13/491,146, filed Jun. 7, 2012, which claims priority to U.S. provisional patent application Ser. No. 61/494,839, filed on Jun. 8, 2011, which are both incorporated by reference in their entireties. This patent application is also a continuation-in-part of U.S. patent application Ser. No. 14/989,572, filed Jan. 6, 2016, which is a continuation of U.S. patent application Ser. No. 13/491,146, filed Jun. 7, 2012, which claims priority to U.S. provisional patent application Ser. No. 61/494,839, all of which are incorporated by reference in their entireties.

GOVERNMENT RIGHTS

This invention was made with government support under contract number SP4701-07-A-001 awarded by the Defense Logistics Agency. The government has certain rights in the invention.

TECHNICAL FIELD

Embodiments of the present application are directed to artificial intelligence type computers and digital data processing systems and corresponding data processing methods and products for emulation of intelligence. The embodiments include supervised machine learning classifiers.

BACKGROUND

Machine learning evolved from the study of pattern recognition and computational learning theory in artificial intelligence. Machine learning explores the study and construction of algorithms that can learn from and make predictions on data. Such algorithms operate by building a machine-implemented model from example inputs in order to make data-driven predictions or decisions rather than following strictly static program instructions.

One type of machine learning involves supervised learning based on a training set as part of a classification process. Examples of machine learning algorithms used for classification include the well-known Naïve Bayes and C4.5 algorithms, or a so-called "stacked" combination of two or more such algorithms. The machine learning algorithm examines the input training set, and the computer 'learns' or generates a classifier, which is able to classify a new document or another data object under one or more categories. In other words, the machine learns to predict whether a document or another type of data object, usually provided in the form of a vector of predetermined attributes describing the document or data object, belongs to a category. When a classifier is being trained, classifier parameters for classifying objects are determined by examining data objects in the training set that have been assigned labels indicating to which category each object in the training set belongs. After the classifier is trained, the classifier's goal is to predict to which category an object provided to the classifier for classification belongs.

A technical problem associated with classifiers is that, in practice, the classifiers that assign objects to categories make mistakes. For example, classifiers may generate false positives, i.e., instances of mistakenly assigning an object to a category, and false negatives, i.e., instances of mistakenly failing to assign an object to a category when the object belongs in the category. These mistakes are often caused by deficiencies of the training set. For example, typically, the larger the training set, the better the classification accuracy. In many instances, large training sets may be unavailable. Also, the accuracy of the labeled data in the training set impacts the classification accuracy. In some cases, the data in the training set may not be correctly labeled, causing the classification accuracy to be compromised.

BRIEF DESCRIPTION OF DRAWINGS

Embodiments are described in detail in the following description with reference to the following figures. The embodiments are illustrated by examples shown in the accompanying figures in which like reference numerals indicate similar elements.

FIGS. 13-17 show examples of screenshots, according to embodiments;

DETAILED DESCRIPTION OF EMBODIMENTS

For simplicity and illustrative purposes, the principles of the embodiments are described by referring mainly to examples thereof. In the following description, numerous specific details are set forth in order to provide an understanding of the embodiments. It will be apparent, however, to one of ordinary skill in the art, that the embodiments may be practiced without limitation to these specific details. In some instances, well known methods and/or structures have not been described in detail so as not to unnecessarily obscure the embodiments.

According to embodiments, advanced techniques, including data mining and data transformation techniques, are used to generate accurate training sets for machine learning operations using data objects provided by multiple data sources. For example, the data objects from each of the data sources are analyzed to estimate whether the data objects can be used to make accurate predictions. For example, quality of the data objects, periodicity of refresh of the data objects, data scarcity, etc., are evaluated to help determine if data objects are amenable to accurate predictions. In addition, these aspects of data objects can be used for creating training sets. Also, information from multiple data sources may be used to supplement data in the data objects for the training set. Furthermore, embodiments can employ different techniques for creating a training set, including techniques that can create a quality training set when data scarcity occurs. Improvements to the quality and accuracy of training sets facilitate improved performance of classifiers generated from the training sets For example, a classifier created from a high quality training set may produce more accurate classification of data objects into categories than a classifier created using a lower quality training set.

Also, according to an embodiment, an ensemble classifier may be generated to classify data objects. The ensemble classifier is generated from multiple machine learning functions, and may produce more accurate predictions than using a classifier generated from a single machine learning function.

Figure 1:
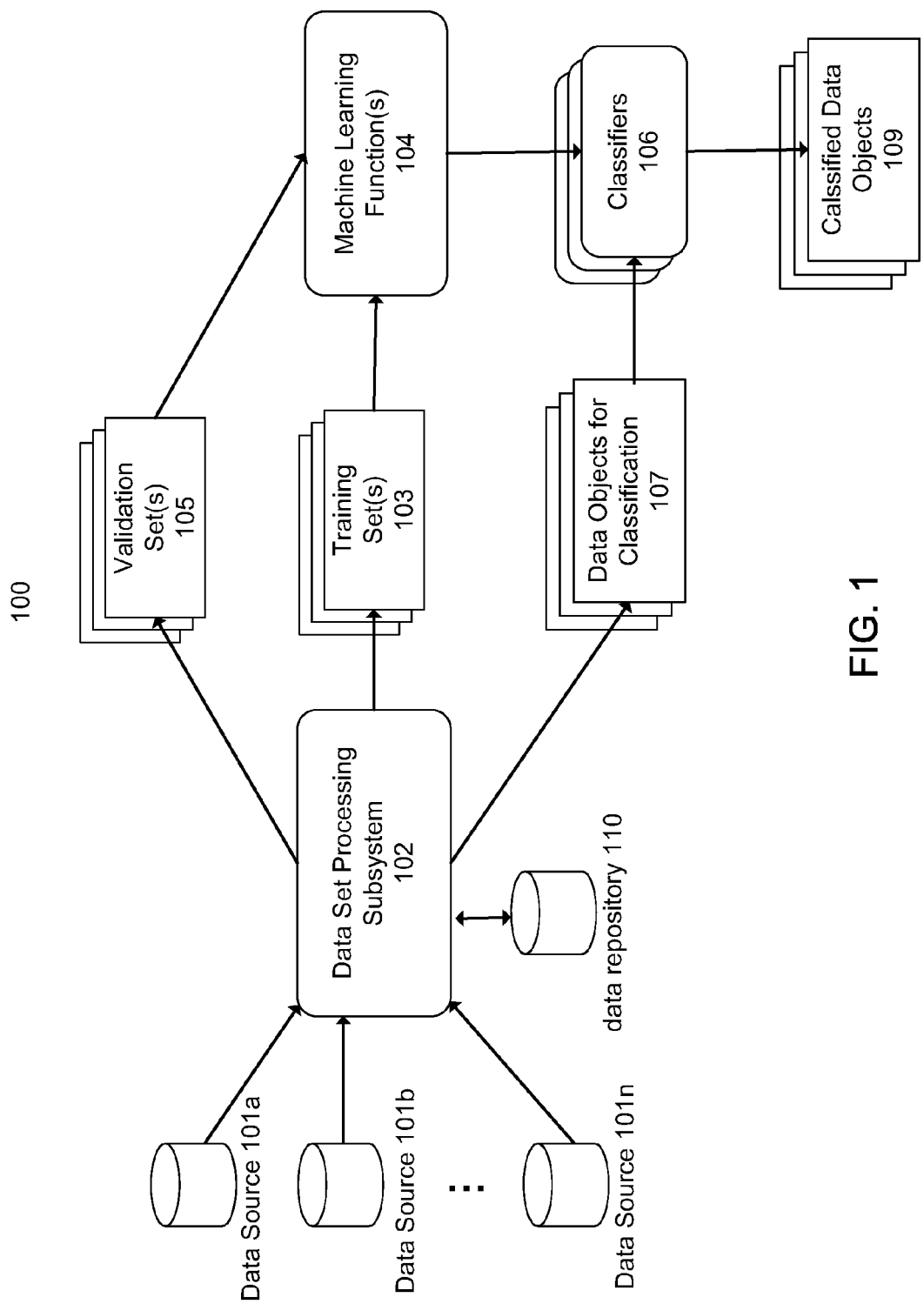
FIG. 1 illustrates a machine learning classifier system, according to an embodiment.

FIG. 1 illustrates a machine learning classifier system 100, according to an embodiment. A data set processing subsystem 102 processes data from data sources 101a-n to generate training sets 103. The training sets 103 may include supervised training sets that include labeled data objects, which are used by one or more machine learning functions 104 to train classifiers 106. The data set processing subsystem 102 may also process data from the data sources 101a-n to generate validation sets 105 to test the classifiers 106. Also, the data set processing subsystem 102 may identify data objects 107 to be classified, and may send the data objects 107 to the classifiers 106 to be classified. Alternatively, or in addition to, being sent from data set processing subsystem 102 to classifiers 106, the data objects 107 to be classified may be sent directly from one of the data sources 101 to the classifiers 106. The data set processing subsystem 102 may store data in a data repository 110 comprised of one or more data storage systems.

The information received from the data sources 101 may include data objects. A data object, for example, may be information to be classified or may be information that can be used for classification, such as metadata describing a data object to be classified. A data object may be represented by a vector of variables (also referred to as attributes), and a value for each variable that describes the data object. Examples of data objects can include, but are not limited to, numbers, files, images, documents, etc. By way of example, whereby the data object is a document, the document may be classified into a category, such as whether the document is a health document or whether the document is a financial document. In another example, a data object may comprise a health record for a patient, and the health record may be classified as to whether the patient is at risk for a particular disease. In yet another example, the data object may be procurement data used for procuring items, services, etc. For example, the data object may represent a bid to supply items, and the bid may be classified as to whether the bid is a high-risk bid, as is further described below. The classifiers may classify whether a bid includes a high-risk price, a high-risk supplier, or a high-risk item. The examples described above, and elsewhere herein, are non-limiting. For example, the classifier generation system 100 may be used to generate classifiers to classify other types of data objects.

The data set processing subsystem 102 generates data sets, such as training sets 103 and validation sets 105. A data set is a set of multiple data objects. A training set is a data set of data objects used for inferring a function for classification (i.e., a classifier). The training sets 103 may include supervised training sets that include labeled data objects, which are used by one or more machine learning functions 104 to generate the classifiers 106. Each of the labels for the data objects can indicate whether the respective data object is classified under a particular category. Labels may be manually generated, may be specified in historic data, or may be generated automatically.

In an example, during a training phase, the training sets 103 are input into the machine learning functions 104. A machine learning function being used to train a classifier adjusts parameters in the classifier in order that it makes accurate predictions for the training set 103. The machine learning functions 104 may include a known induction algorithm, such as Naive Bayes, C4.5 decision trees, Support Vector Machines, logistic regression, step-wise logistic regression, chi-squared tests for predictive variable selection, and others. Accordingly, inputting a training set to a machine learning function generates a classifier, such as one of the classifiers 106, trained to classify the data objects into a category associated with the labels in the training set. After being trained, the classifiers 106 are used to classify data objects without labels, such as data objects 107.

The data set processing subsystem 102 may perform data mining and data transformation techniques on data objects received from the data sources 101 to generate the training sets 103 to induce more accurate classifiers. The data set processing subsystem 102 may generate a data object from data received from multiple data sources. A data object may be comprised of multiple variables, which in turn may have been provided by multiple data sources. The data set processing subsystem 102 may collect and store the variables for each data object to build the training data sets 103 and validation data sets 105. A subset of the variables may be selected as predictive variables to induce a classifier.

According to an example, the data set processing subsystem 102 may perform data partitioning, filtering, data transformation to create data objects from multiple data sources. Staging tables may be used for the data processing performed by the data set processing subsystem 102. In an example shown in FIG. 2A, staging tables 201 may be used to create the data objects which are subsequently loaded into database tables 202, which may be used to generate the training and validation data sets 103 and 105. For example, data objects to be classified may represent vendors that supply items for use in satisfying a procurement request. For example, a training set of the training sets 103 is generated to train a classifier of the classifiers 106 to classify vendors as "high-risk" or not. High-risk may be based on whether a vendor is likely to provide counterfeit or otherwise non-conforming items or not. Each data object may be comprised of multiple variables describing the vendors.

In an example, data from a reliable data source is loaded into staging tables 201. For example, data source 101a may be associated with an internal procurement system having a data repository of historic procurement data captured, for example, over several years. Staging tables 201 may include fields from the data repository of historic data, including, for example, vendor name, vendor identifier (ID), etc. Multiple fields of the historic data may be included in the staging tables 201. These fields may be supplemented by additional fields based on data retrieved from other ones of the data sources 101, as is further described below.

Data partitioner 210 may partition loaded data. For example, a date range is selected, such as the most recent six years of data, and stored in a partition in the staging tables 201 The data may be further partitioned to create validation data sets 105, and to identify a subset of the partitioned data, for example the most recent data (e.g., data for the last 12 months), which may include data objects 107 to be classified.

The data set processing subsystem 102 may include a query generator 211 to generate queries to retrieve related data from other ones of the data sources 101. Examples of the retrieved related data are described below. For example, the query generator 211 may automatically generate a query using fields from the staging tables 201 that are populated with data from the data source 101a (e.g., data from an internal system such as a procurement system or another trusted system). For example, the query generator 211 generates a query with vendor name and vendor ID for a specific vendor record in the staging tables 201, and executes the query on other ones of the data sources 101. This may include interfacing with various data sources through an interface, such as an application programming interface (API), to execute the query. The query results are received from the data sources 101b-n and stored in the staging tables 201. Retrieved information may include demographic information, such as address, vendor codes, industry codes, credit score, financial stress score, debarment indicator, criminal activity indicator, compliance risk index, number of total payments, number of slow, late and delinquent payments, bankruptcy indicator, number of employees, lawsuits, liens, judgments, and/or other variables and/or information describing the vendors. If the received data matches an existing field, such as in terms of data type, data range, etc., the data is stored in an existing field; otherwise the data is stored in a new field. Also, new fields may be manually analyzed after being populated to determine whether the fields include relevant data and to assign a field name and field constraints to the field. Through the data retrieval process, data objects are created for the vendors, including multiple variables from multiple data sources, and the data objects may be stored in the staging tables 201.

Filtering module 212 and transformation module 213 can filter and transform data objects in the staging tables 201 for loading into the database tables 202. Filtering module 212 may perform quality checks and may filter variables that may not be predictive. For example, quality checks may be checking for null data or data outside field constraints, and evaluating variables in the staging tables 201 for data scarcity. Variables with a high rate of missing data or having no or little variation in value may be filtered (e.g., removed) and not loaded into the database tables 202. Next, for variables with an acceptable rate of missing values and having an acceptable variation of values, missing data may be populated with mean or median values for the variable depending upon the variable under consideration.

Variables from the staging tables 201 may be transformed by the transformation module 213 before loading into the database tables 202. Transformations may include executing a transformation function on a field before loading operation into the database tables 202 is performed. A transformation function may convert data to be placed in the same field to the same unit, such as a same unit of measurement, a same currency, a same lot size, etc., combine fields into a single field, create a new field, or execute other operations on a field. In an example, a variable is created for foreign, electronics vendors that have an industry code for electronics and that have an address outside the United States. Another example of a transformation function may include applying an inflation cost adjustment to historic prices for present value calculations.

Also, prior to loading the database tables 202 from the staging tables 201, the variables in the staging tables 201 may be evaluated by a factor analysis module 214 to identify relationships between the variables and to identify variables that may be used as predictive variables for a classifier. While strong correlations between predictive variables and a target variable (e.g., the category being predicted) are desired, such high correlations between predictive variables themselves can be undesirable and can greatly affect the accuracy of the final classifier through multicollinearity. For example, the factor analysis module 214 determines the predictive variables that are highly correlated, and performs a factor analysis process to mitigate their effects. In the process, variables that are highly correlated with each other are combined into a single variable which can then be used by one or more of the machine learning functions 104 to train a classifier without the consequences of multicollinearity, as long as those factors do not correlate with other variables.

After the factor analysis process is performed by the factor analysis module 214, the data from the staging tables 201 is loaded into the database tables 202. The data for the data objects that is loaded into the database tables 202, including the variables describing the data objects, may be partitioned into the training sets 103 and the validation sets 105. For example, the data is divided into a "training" set and a "validation" set. The validation set is used to validate the classifier generated from the training set. For example, the validation set includes data objects pre-determined to be in particular categories, and the trained classifier classifies the data objects in the validation set to determine whether the classifier correctly classifies the data objects into their particular categories. Regarding the training set, data objects in the training set are labeled. For example, if the data objects represent vendors, the labels may indicate whether the vendors are high-risk or not high-risk. In an example, the machine learning function trained according to the training set is step-wise logistic regression, which can be used to generate one of the classifiers 106. The step-wise regression can determine relationships between predictive variables from the training set and the target variable being predicted, such as whether a vendor is a high-risk vendor. Following this operation, if the classifier is successful at predicting the target variable, the training and test sets are combined and the classifier is run again on the entire population of vendors in the combined training and test sets. The final classifier is the classifier that is deemed successful at classifying the combined training and test sets.

Multiple classifiers may be created to classify different data objects into various categories. The staging tables 201 and database tables 202 may include tables to store data for different types of data objects. For example, vendor data objects may be stored in one set of tables, and data objects representing items to be procured may be stored in another set of tables, and so on. Training and validation sets may be generated for each of the classifiers 106 for training and testing. Each of the classifiers 106 may classify data objects into different categories. For example, a classifier may classify data objects representing vendors or suppliers, where the classifications indicate whether the vendors or suppliers are high-risk or not. In another example, a classifier may identify items to be procured as high-risk or not. Price risk classifiers may also be generated.

Figure 2A:
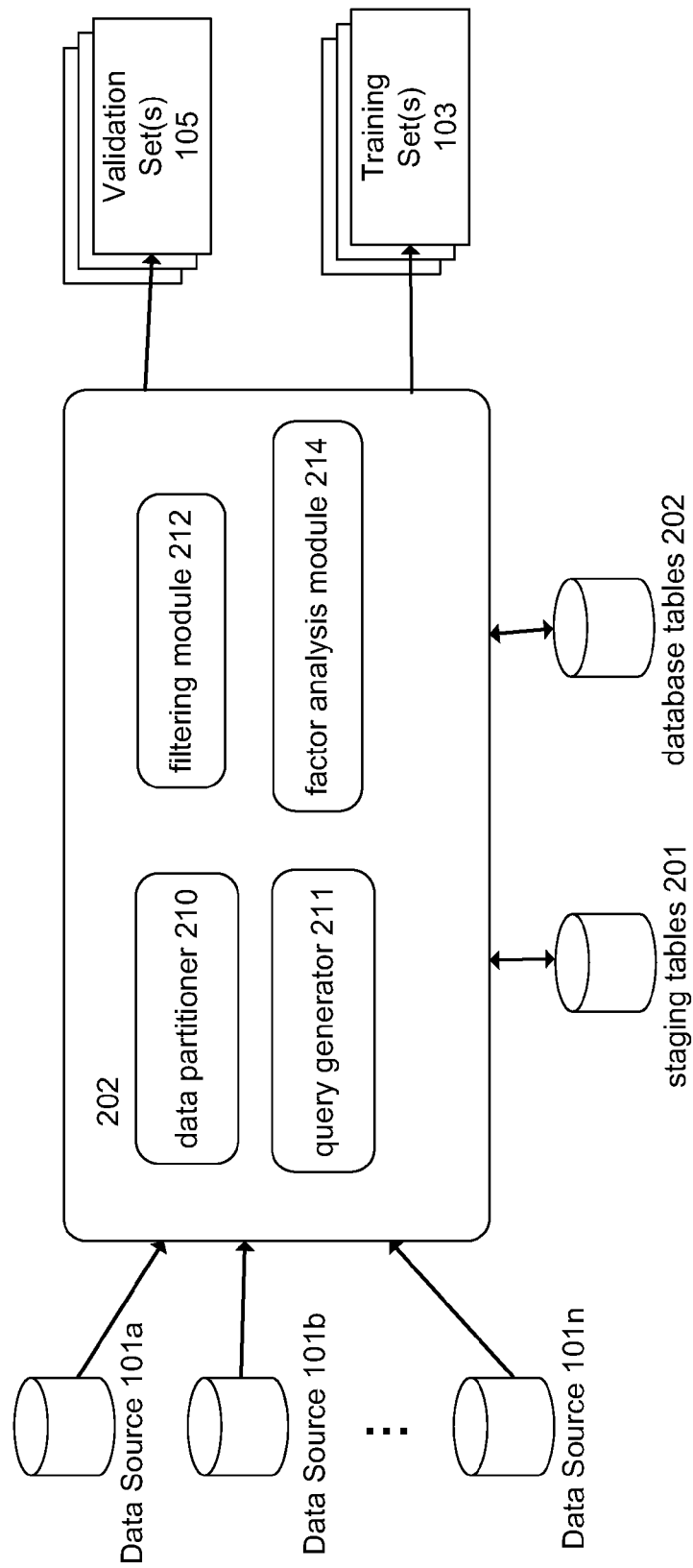
FIG. 2A illustrates a data set processing subsystem, according to an embodiment.

Processes described with respect to FIG. 2A may be performed to generate training and validation sets for a classifier to classify data objects for items to be procured as high-risk or not. For example, the data from an initial data set from data source 101*a* is partitioned. Data objects for "general merchandise" may be removed since those items may be procured differently than other items, such as items prone to being high risk. Data objects may be further filtered and transformed, and factor analysis may be performed. Data objects indicative of a high-risk item are labeled for the training set. Examples of the variables for the data objects representing items to be procured may include number of instances an item was purchased over the past six years, an indicator of an item's criticality, and whether the item had a diminishing manufacturing source etc.

As discussed above, an ensemble classifier may be generated to classify data objects. The ensemble classifier is a classifier generated from multiple machine learning functions, and may obtain more accurate predictions than using a classifier generated from a single machine learning function.

Figure 2B:
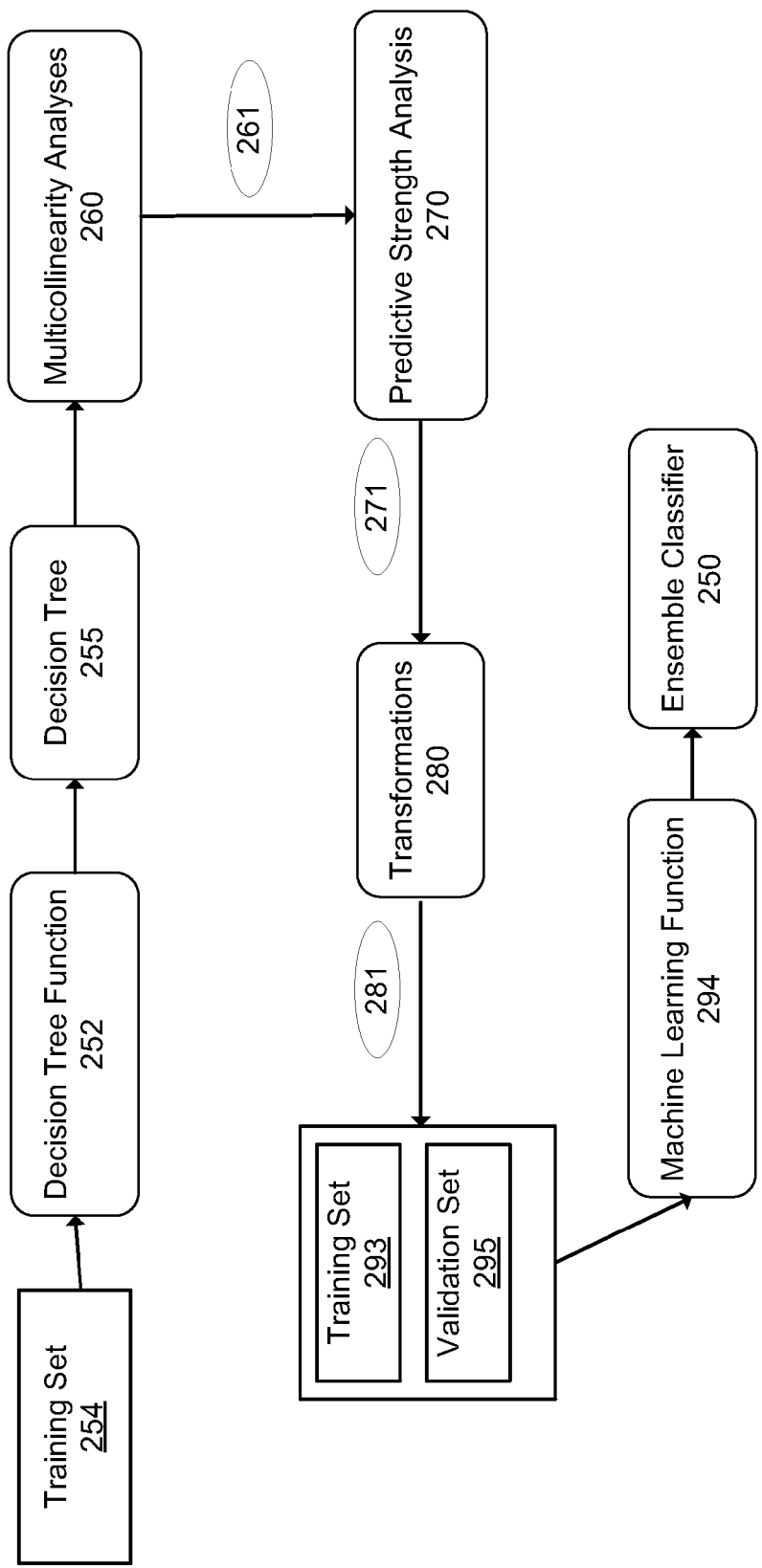
FIG. 2B illustrates a data flow diagram for creating an ensemble classifier, according to an embodiment.

FIG. 2B shows a data flow diagram for creating an ensemble classifier 250, which may be used as one of the classifiers 106 to classify the data objects 107, according to an embodiment. As discussed above, an item-risk classifier may be generated to classify data objects representing items to be procured as high-risk or not. The ensemble classifier 250 may be used for such a classifier, and creating the ensemble classifier 250 is described below, by way of example, with respect to generating an item-risk classifier. It will be apparent to one of ordinary skill in the art that the ensemble classifier 250 may be generated to perform other types of classifications.

As shown in FIG. 2B, a decision tree 255 may be generated through supervised learning. For example, training set 254, which may be one of the training sets 103, is applied to the decision tree function 252 to generate the decision tree 255. The training set 254 may include predictive variables and the target variable. The decision tree function 252 may be one of the machine learning functions 104. Decision trees compatible with embodiments disclosed herein may be generated using known techniques and/or software applications, such as a commercially available a machine learning software product. For example, R is an open source suite of software facilities that include machine learning functions, such as one or more of the machine learning functions 104, and tools for performing other machine operations described herein. R is a GNU project which was developed at Bell Laboratories® (now Lucent Technologies®) by John Chambers and colleagues. R includes a decision tree library which may be used for the decision tree function 252. Other machine learning tools may also be used to generate the decision tree 255. For example, open source software by WEKA (created by Mark Hall, Eibe Frank, Geoffrey Holmes, Bernhard Pfahringer, Peter Reutemann, Ian H. Witten (2009)) and SAS® Enterprise Miner™ are machine learning software that include machine learning functions and tools for performing other machine operations described herein.

The training set 254 may be a supervised training set including predictive variables and the labeled target variable (e.g., an indication of whether the item being procured was a high-risk item or not). The training set 254 may be generated from historic procurement data. Some examples of the predictive variables may include an amount of item purchased for each procurement, a quantity purchased in each procurement, a production lead time for the supplier to provide the item, a commonality of a unit in the bid specifying the amount of the item to be supplied, the type of item (e.g., microprocessors may be considered higher risk than a fastener), geographic location of manufacturing of the item, the use of the item (e.g., military versus civilian), past supplier history with respect to providing items, etc. Although not shown in FIG. 2B, the decision tree 255 may be validated with a validation set, such as described with respect to FIG. 1.

The decision tree 255 may identify ranges of values for continuous predictive variables (e.g., predictive variables which have values that lie on a continuum, such as procurement lead time) that are predictive of the target variable, and the decision tree 255 may identify binary values for categorical predictive variables (e.g., predictive variables which have values that are binary, such as whether an item was procured for military use or not) that are predictive of the target variable. The decision tree 255 maps the identified ranges of values for the continuous predictive variables and the identified binary values for the categorical predictive variables to conclusions about the target variable (e.g., high-risk or not). Embodiments may be configured to allow the mapping to be logically represented in a tree structure. Also, the decision tree function 252 may determine p-values for the predictive variables which indicate a level of significance for each predictive variable in predicting the target variable. The p-values may be determined by the machine learning software used to determine the decision tree 255. In an embodiment, the decision tree 255 may be generated over multiple iterations whereby different factors are changed, such as the predictive variables used in the decision tree, number of stages in the decision tree, etc.

From the decision tree 255, the predictive variables in the decision tree 255, are analyzed for multicollinearity at 260. Multicollinearity means that one variable can be linearly predicted from another variable. The multicollinearity analyses performed at 260 identifies collinearity of the predictive variables. The multicollinearity analyses performed at 260 may include the analysis similar to, or the same as, the factor analysis performed by the factor analysis module 214 described above. Examples of machine learning software described above may include tools for determining multicollinearity of predictive variables. For example, R includes a library for identifying collinearity among predictive variables through variance inflation factors (VIF). A VIF for a single predictive variable is obtained using the r-squared value of the regression of that variable against all other predictive variables. The higher the VIF value, the higher the collinearity, and a predictive variable with a high VIF value (e.g., 5-10) may be removed. Accordingly, from the multicollinearity analysis performed at 260, a set of predictive variables 261 is determined that includes predictive variables from the decision tree 255, whereby the collinear predictive variables are removed.

The set of predictive variables 261 may be provided for additional predictive strength analysis at 270. For example, Chi-square tests are conducted on categorical predictive variables to assess and reaffirm strength of the categorical predictive variables from the set 261. T-tests may be conducted to assess and reaffirm strength of the continuous predictive variables from the set 261. These tests may determine the p-values of the predictive variables in the set 261, and the predictive variables having p-values less than a threshold (e.g., 0.05) may be removed from the set 261 to create a set of the predictive variables 271, which may be estimated to have a level of significance (e.g., a highest level of significance) for predicting the target variable.

Transformations may be performed on the set of the predictive variables 271 at 280. Transformations may include transforming predictive variables in the set 271 into new predictive variables, such as through stepwise regression. For example, assume the decision tree 255 identifies ranges of values for the production lead time predictive variable as follows: less than 179 days is high-risk, greater than 179 days but less than 280 days is not high-risk, and greater than 280 days is high-risk. The transformations may assess whether to convert this into two predictive variables, such as one predictive variable for less than 179 days or greater than 280 days for high-risk, and one predictive variable for not high-risk (between 179 and 280 days), or whether to keep it as. Also, after the transformations are performed, multicollinearity may be analyzed again, such as performed at 260, to remove collinear predictive variables, and a set of predictive variables 281 may be generated from the set 271, which includes the transformed variables, and which does not include predictive variables determined to be collinear.

The ensemble classifier 250 is generated and validated using the predictive variables from the set of predictive variables 281. For example, a training set 293, which may be one of the training sets 103, and a validation set 295, which may be one of the validation sets 105, include the set of predictive variables 281. The training set 293 is applied to machine learning function 294, which may be one of the machine learning functions 104, to generate the ensemble classifier 250. The ensemble classifier 250 is tested with the validation set 295. The generation and testing may be an iterative process. In an example, the machine learning function 294 is a logistic regression machine learning function, such as a Bernoulli Naive Bayes logistic regression function.

Figure 3:
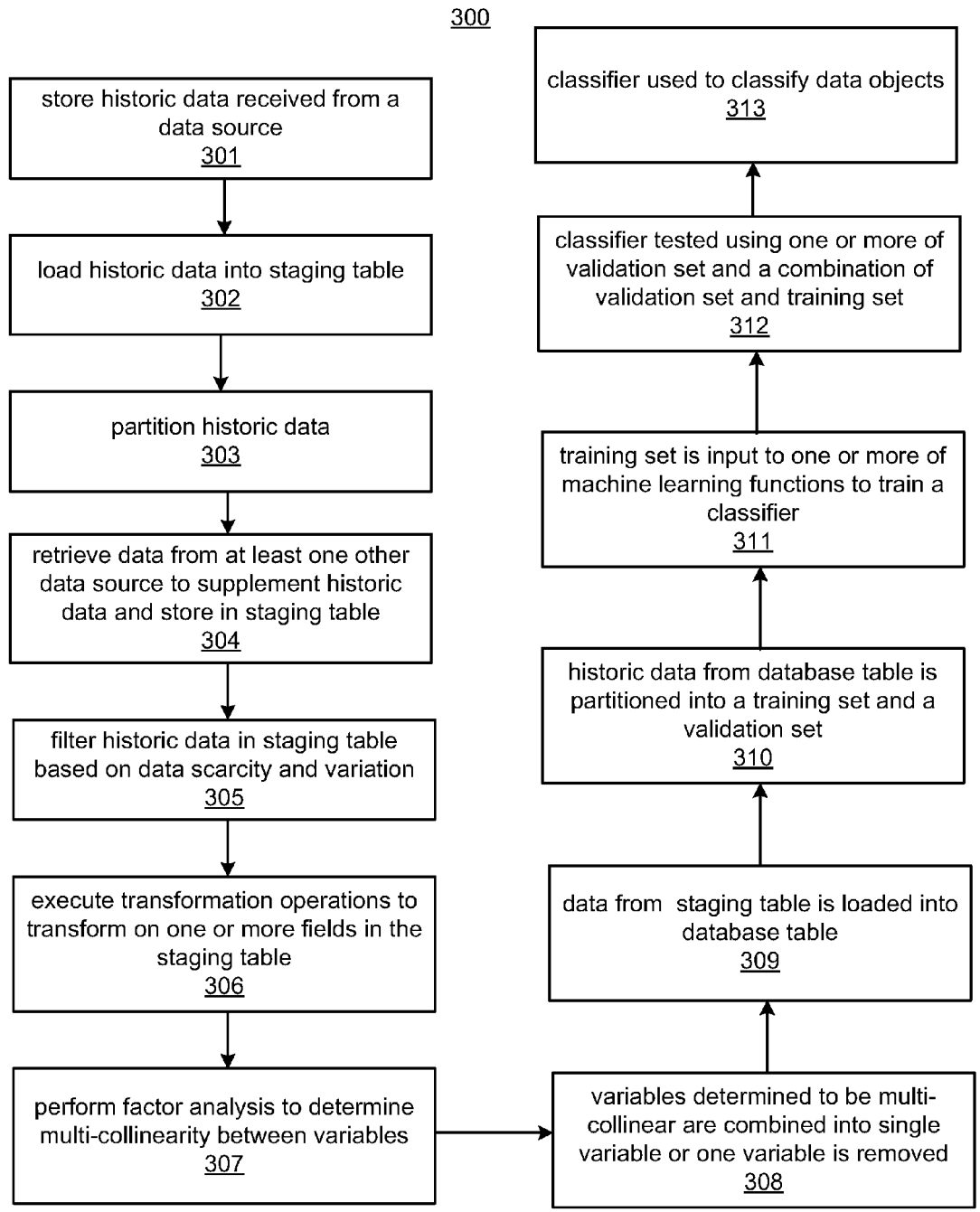
FIG. 3 illustrates a method to generate a classifier, according to an embodiment.

Other types of data objects and classifiers and models may be generated by the system 100. For example, "should-cost" models may be generated to identify costs associated with transactions, as is further discussed below. FIG. 2A and FIG. 3, which is described below, are described with respect to using staging and database tables for the dataset processing. In other embodiments, other storage structures may be used.

FIG. 3 illustrates a method 300 according to an embodiment to generate a classifier. The method 300 may be performed by the system 100. At 301, an initial data set is received and stored which includes historic data. For example, data from one of the data sources 101, such as data source 101a, is received. The data source 101a is able to provide historic data for use in generating a training set. For example, data source 101a may be an internal procurement system with a data repository of historic procurement data captured over several years. At 302, the received historic data is loaded into a staging table, such as one or more of staging tables 201. At 303, the historic data is partitioned. In an example, the data may be partitioned to select sufficient historic data for training a classifier. Partitioning may be based on a date range, such as most recent "x" number of years of data objects, where "x" is an integer greater than 0.

At 304, data is retrieved from other ones of the data sources to supplement the historic data, and stored in the staging table. For example, a query is generated using data from one or more fields of historic data in the staging table to retrieve data from other data sources to supplement the historic data. At 305, variables from the historic data in the staging table, which may be fields in the staging table, are filtered based on data scarcity and variation. For example, variables with a high rate of missing data or having no or little variation may be removed.

At 306, data in the staging table is transformed. For example, one or more fields may be transformed according to predetermined transformation operations. A transformation function may convert to the same unit, or combine fields into a single field or create a new field or execute other operations on a field. In an example, a variable is created by combining information from other variables. At 307, factor analysis is performed to determine multicollinearity between variables and identify variables that are highly correlated. At 308, variables that are determined to be multicollinear are combined into a single variable or one variable is removed from the staging table.

At 309, the data from the staging table is loaded into the database table. At 310, historic data from the database table is divided into a training set and a validation set. The training set includes labeled data objects for supervised training of a classifier. Labels may be entered manually for each data object in the training set based on expert analysis. A label specifies whether the data object belongs to a particular category or not. The training set is input to one or more of the machine learning functions 104 to train a classifier at 311. At 312, the classifier is tested using one or more of the validation set and a combination of the validation set and the training set. After the classifier has been determined to be accurate, at 313, the classifier classifies data objects 107. For example, the classifier receives data objects 107 to be classified and generates a probability for each data object, where the probability value indicates whether the data object is classified in a particular class or category.

Figure 4A:
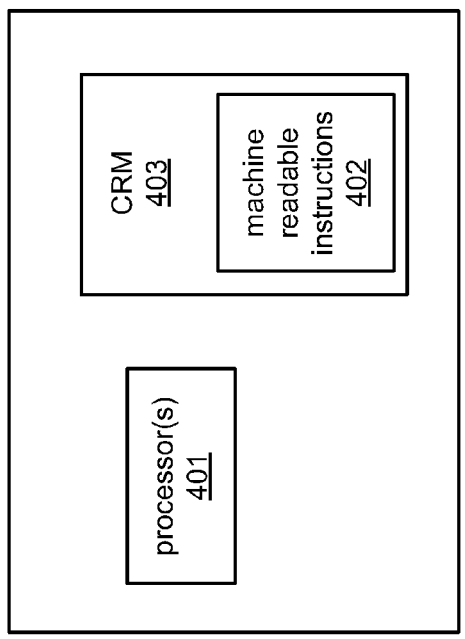
FIGS. 4A-B illustrate hardware for a classifier system, according to embodiments.
Figure 4B:
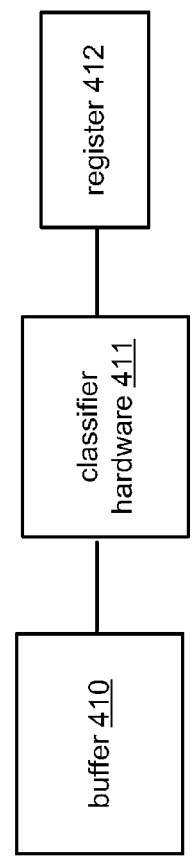

FIG. 4A illustrates an example of a computing hardware configuration for the system 100. Although not shown additional hardware components may be used for the system 100. One or more processors 401 may execute machine readable instructions 402 stored in a non-transitory computer readable medium 403 to perform the operations of system 100, including the operations of subsystem 102. The classifiers 106 of the system 100 may be executed by one or more of the processors 401 or other hardware. FIG. 4B shows an example of hardware for any of the classifiers 106. A buffer 410 holds data objects to be classified by the classifier. The data objects may be provided from a training set of the training sets 103 if the classifier is being trained or a validation set of the validation sets 105 if being tested or from the data objects 107. Hardware 411, such as a processor of the processors 401, or a field programmable gate array, or other hardware executes one or more of the machine learning functions 104 to classify data objects in the buffer 410. For a support-vector classifier or a logistic regression classifier, weights for the classifier may be stored in the hardware 411. The results of the classification may be stored in register 412, which may be a "1" or a "0" for a binary classification of whether a data object input to the classifier belongs to a particular category, or other values, such as a probability between 0 and 100 that a data object belongs to the category.

The system 100 discussed above may be used to generate classifiers to classify data objects for a variety of different categories. According to an embodiment, the system 100 is used to generate classifiers to classify different types of procurement data as high-risk or not. For example, an entity, such as a government agency, corporation, etc., may acquire goods or services through a procurement process. The procurement process may encompass sending out a request for bids to supply goods or services, and receiving bids from vendors or other organizations to supply the goods or services. High-risk procurements may potentially represent a risk for fraud (e.g., substituting an unauthorized product, a counterfeit of a desired product, etc.), waste and abuse. For example, a high-risk procurement is a procurement having characteristics that meet certain criteria. The criteria may be related to identifying fraud, abuse, or general errors. A procurement is the acquisition of items, which may include one or more goods or services. A typical procurement process includes accepting bids to supply items from one or more suppliers and selecting one or more bids for the procurement of the items. The procurement process may include posting a request for bids or proposals that provides a description of the items being procured and any constraints on the procurement.

The system 100 may identify characteristics, such as predictive variables, of high-risk procurements and develop classifiers to classify bids or aspects of bids as high-risk using the predictive variables and/or other information. The characteristics and their relationships can be quantified to generate classifiers for evaluating and grading bids for each procurement in order to identify one or more bids to accept for the procurement. The classifiers and scoring models can be incorporated into (or used with) a procurement system and ultimately into a computer-implemented workflow for procurement that is used by procurement specialists and/or leadership of entities making procurements. As a result, entities acquiring goods or services through a procurement process can have visibility into high-risk procurements early in the procurement process while there is still time to proactively react. Early detection of high risk items allows these bids to be rejected or remediated to significantly reduce or eliminate risk to the procuring entity. Also, procurement request risk may be tracked as a metric using computer implemented embodiments disclosed herein. Other metrics may also be captured for each procurement when desired. Embodiments allow metrics and other information related to high risk and non-high risk procurements to be archived and used for subsequent procurements. As a result, embodiments become more accurate and effective at identifying high-risk procurements over time, thus allowing procuring entities to lower procurement costs while improving procurement quality and efficiency.

Figure 5:
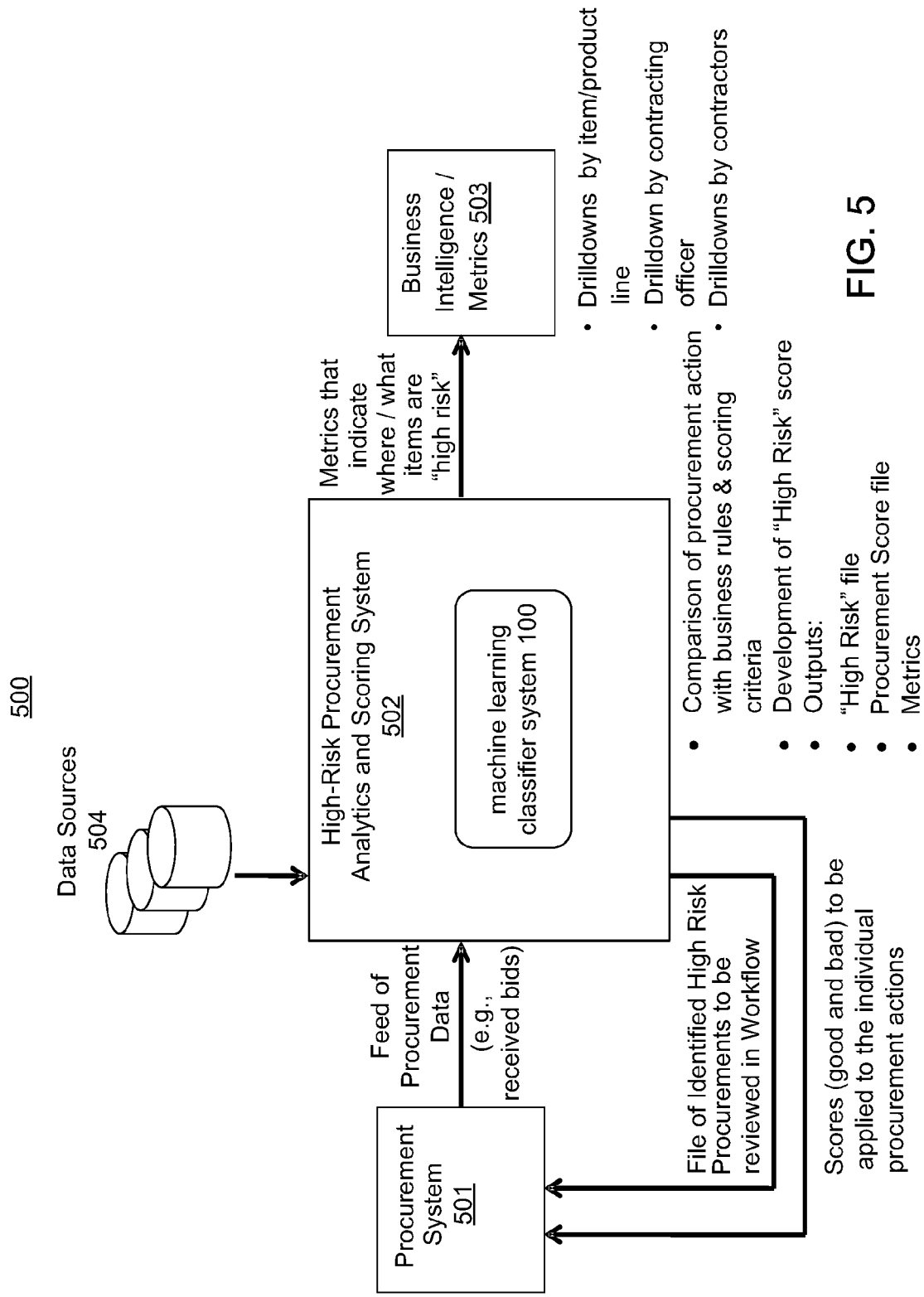
FIG. 5 illustrates a system, according to an embodiment.

FIG. 5 illustrates a system 500, according to an embodiment. The system 500 includes a procurement system 501 and data sources 504 that provide data to a high-risk procurement analytics and scoring system 502, hereinafter referred to as system 502. The system 502 may include the machine learning classifier system 100 described above. The data sources 504 may include outside data sources and/or data sources internal to the system 500, such as internal enterprise applications or a data repository maintained internally by the procuring entity for storing procurement activity over time. The procurement system 501 may provide historic procurement data, such as data objects from historic procurement data which may be used to generate training sets 103 and validation sets 105. Also, the procurement system 501 may provide the data objects for classification 107 (shown in FIG. 1). The system 502 develops one or more scoring models, including classifiers 106, and uses the scoring models to identify high-risk procurements from "live" data, such as data objects for classification 107. The feed of procurement data may include the live data that is sent to the system 502 for scoring and to identify high-risk procurements. The system 502 may interface with the data sources 504 over a network, which may include a public network, such as the Internet, and/or a private network (such as a proprietary or secure network) to receive procurement data. Procurement data includes any data that may be used for generating the models, including the classifiers 106, and evaluating procurement bids.

Business rules, logistic regression and scoring criteria may be used for developing scoring models and/or for scoring procurements. The output of the system 502 may include scoring models, including the classifiers 106, a high-risk file identifying high-risk procurements (e.g., high-risk vendors, high-risk items, high-risk services, etc.), a procurement score file identifying scores for procurements, and business intelligence metrics 503. The high-risk procurements identified in the high-risk file sent to the procurement system 501 may continue to be evaluated in a workflow used by the procurement system 501 before the procurement process is closed. For example, procurements flagged as high-risk may be given further analysis to determine whether they can be accepted or denied. The metrics 503 may be displayed via a dashboard or provided to the procurement system 501 for further evaluation.

Also, scores in the procurement score file may include favorable (e.g., good) scores as well as unfavorable (e.g., bad) scores. These scores may be used to create or update scoring models or used for additional analytics. The scores may be comprised of multiple elements related to a procurement. Metrics may indicate where and what items are high-risk, and may include drill downs by item/product line, drill downs by contracting officers, drill downs by contractors, etc. to facilitate decision making by system 100. For example, the metrics may be included in daily or periodic reporting of the scores to the user. The metrics may be used to identify trends that warrant further analysis, such as whether a particular geographic region or procurement officer is associated with an unusually high number of high-risk procurements.

Figure 6:
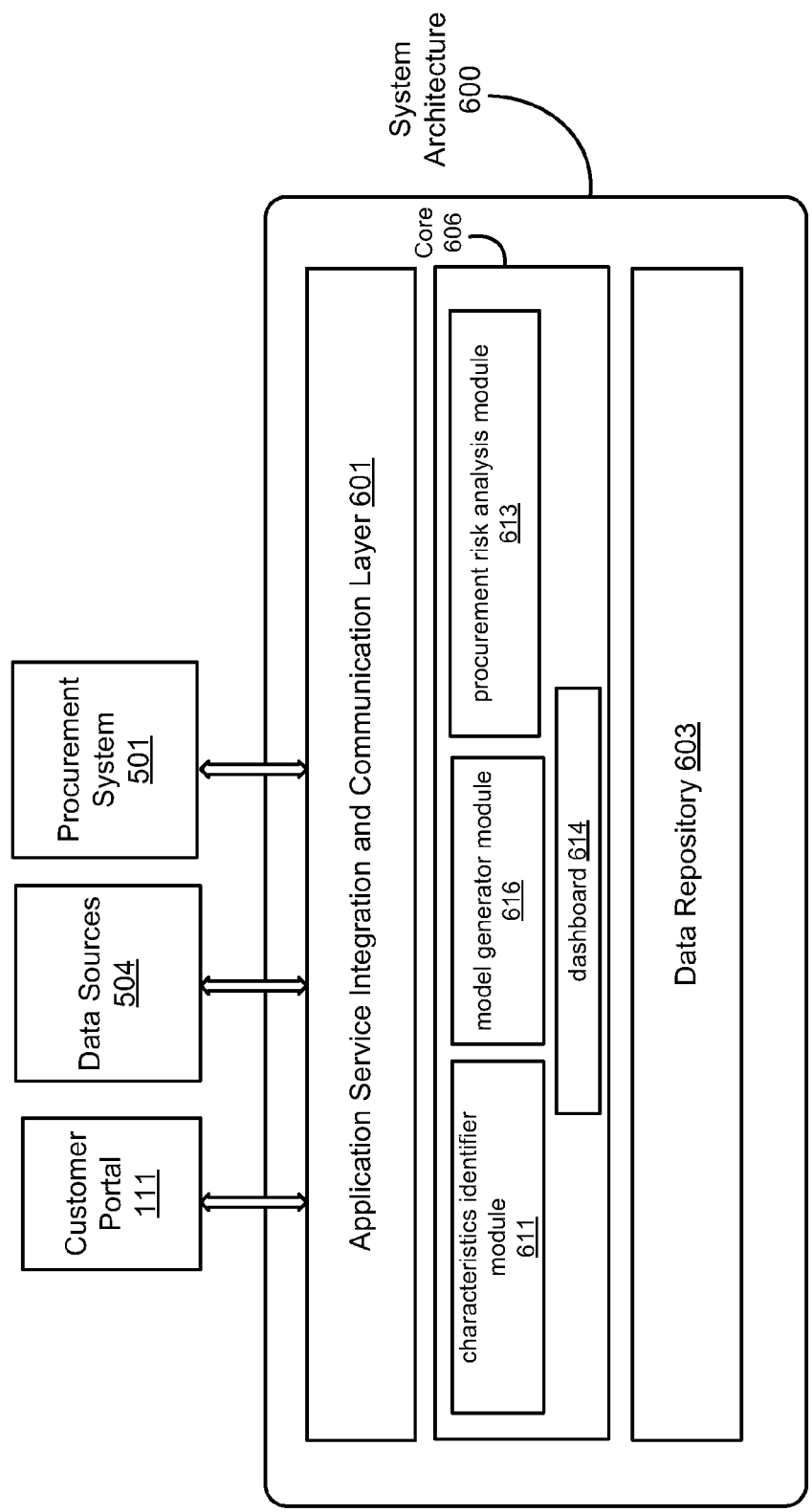
FIG. 6 illustrates a system architecture, according to an embodiment.

FIG. 6 illustrates a system architecture 600 of the system 502. The system 502 may be implemented as software (e.g., machine-executable instructions) stored on a non-transitory computer readable medium and executed by one or more processors. The architecture 600 may represent a software architecture that is implemented on computing hardware.

The architecture 600 includes an application service integration and communication layer 601, a core 606 and data repository 603. Data repository 603 can include data structures storing procurement data on one or more storage devices. The application service integration and communication layer 601 supports data collection from the data sources 504, the procurement system 501 and other systems and applications. The layer 601 may also provide secure access with a customer portal 111, which may allow users to log into the system 502 to view data or perform other operations. The layer 601 may utilize a full featured web services library to provide a connection for the customer portal 111 to the system 502. Generally, the layer 601 provides a mechanism for interfacing with the different systems and web interfaces.

The layer 601 may include APIs to communicate with the data sources 504, the procurement system 501 and other systems and applications. For example, the layer 601 receives data from the data sources 504, the procurement system 501 through APIs or other interfaces and may normalize the data for storage in data repository 603. Normalizing may include formatting according to predetermined schemas. For example, the layer 601 may map received data to schemas of data structures, which may include tables in the data repository 603 based on determined types and fields. Then, the data may be stored in the tables in the data repository 603. The data repository 603 may include a database comprised of the tables.

The information stored in the data repository 603 may include model building data sets and validation data sets, which may be determined from the procurement data or other data received at the system 502. Other stored information may include models generated by the system 106, business rules for the models, bid evaluation results, evaluation capacities, information describing procurements (e.g., items being procured, constraints for bids, etc.), and information from received bids. Data repository 603 can store procurement related information over time to allow system 100 to become more accurate over time. Since system 100 can handle extremely high volumes of procurements, the amount of information stored in data repository 603 can become extremely large. As a result, data repository 603 can be implemented as a standalone or distributed repository and can used in conjunction with "big data" frameworks, algorithms, protocols, etc.

The core 606 performs operations and/or functions of the system 502. For example, the core 606 may perform the methods described in connection with flowcharts included herein, including processes for model building and bid evaluation.

The core 606 may include a characteristics identifier module 611, a model generator module 616, a procurement risk analysis module 613 and a dashboard 614. The characteristics identifier module 611 identifies characteristics of high-risk procurements. Machine learning, such as neural networks, logistic regression or other functions may be used to identify the characteristics. For example, the characteristics may include predictive variables for generating the models, including the classifiers 106. The predictive variables may be related to cost, quantity, industry-specific characteristics, etc.

The characteristics may further include "should cost" data tables that include information identifying how much an item should cost. A "should cost" table may include information about how much an item similar to an item being procured costs (e.g., in ranges from "low cost", median cost, and "high cost"). This information may be gleaned from the data sources 504, which may include data obtained from other procurement organizations, commercial databases, historical pricing indices, etc. Should cost data can further be organized or limited to regions, such as a geographic region (e.g., from a domestic organization or from organizations that do strategic sourcing across the globe). Costs may further vary by industry or other categories.

Another characteristic for comparison may be company location and production information for companies that are bidding on a procurement. In one example whereby the United States (U.S.) government is procuring items, company data could be linked to "Buy American Act" decisions. For example, if the company doesn't have primary production facilities in the U.S., then the company would likely have to sub-contract out the work to a U.S. company or work the production into their facilities inside the United States. Other procurement rules may be identified to determine whether a company may have the characteristics to meet the criteria specified in the rules.

Network analysis could be used to identify companies that have "close associations" with companies that either have unscrupulous partner companies or represent potential conflicts of interest or other violations. For example, network analysis may be used to identify companies that have violated the Foreign Corrupt Practices Act (bribery or corruption), or companies that have been accused of providing counterfeit goods. Network analysis may be performed by external providers or internal systems and can be performed using public and/or private data. For example, social networking data and/or social network analytics can be used alone, or in combination, with other data, such as past procurement data from a proprietary database, to facilitate identifying vendors, items, or services that may be high-risk.

Former bids and bid rules can also be incorporated as a component. For example, rules can be built into the system 502 that indicate that for buys of $20,000 or more, if 2 or more bids are not received then it identifies the procurement as a "high-risk" procurement that requires an audit operation before a procurement can be completed. For example, a computer-implemented audit can be trigger. In another embodiment, a manual audit may be triggered. Former bids can be used to indicate another range of plausible dollar values for a procurement.

A review of previously identified "high-risk" procurements produces a "domain" of potential rule based structures that can be utilized as rules for identifying high-risk procurements. In "machine learning" or database mining activities, these rule based structures may be applied in a decision tree based approach. For example, these rules may be developed by the characteristics identifier module 611 using one or more of the characteristics described above. The rules may be developed according to a model building data set or one of the training sets 103, which may be received from one or more of the data sources 504 and then tested on one of the validation sets 105. The scoring model may be generated based on the rules, and the procurement risk analysis module 613 uses the scoring model to score procurements and identify high-risk procurements.

The model generator module 616 generates the scoring models. Scoring models, including the classifiers 106, may be generated for different risk areas. The models may be generated using logistic regression, business rules or other ones of the machine learning functions 104 based on variables. The variables may be received from the data sources 504. For example, logistic regression can be performed by a processor to build a multivariate model. For example, predictive variables, i.e., covariates, are selected and a model is generated using the variables. A variable may be removed and the model refitted to determine if the new model differs from the old model. Detection of a difference between the new and old models may indicate the variable is considered important and is kept. This process is repeated until the variables are determined for the model. Embodiments can incorporate thresholds with respect to difference values between a new and old model so that variables are kept when a threshold value is satisfied. Examples of the models are further described below.

The dashboard 614 may facilitate presenting information related to the bid evaluation. For example, the procurement risk analysis module 613 evaluates the received bids for a procurement based on the scoring models. Evaluation results and identification of high-risk bids may be presented via one or more user interfaces, such as dashboard displays, provided by the dashboard 614. For example, the dashboard 614 may generate a graphical user interface (GUI) presented on a computer screen. The computer screen may be a display provided as an input/output mechanism used in conjunction with system 100. The GUI may provide graphical illustrations of price risk, supplier risk and item risk for bids based on the evaluation of the bids. Also, the GUI may graphically illustrate scores for the bids and present information for the bids. The GUI may represent bid information such that bid information is selectable for drill downs to display additional information describing a risk profile for a given bid.

Figure 7:
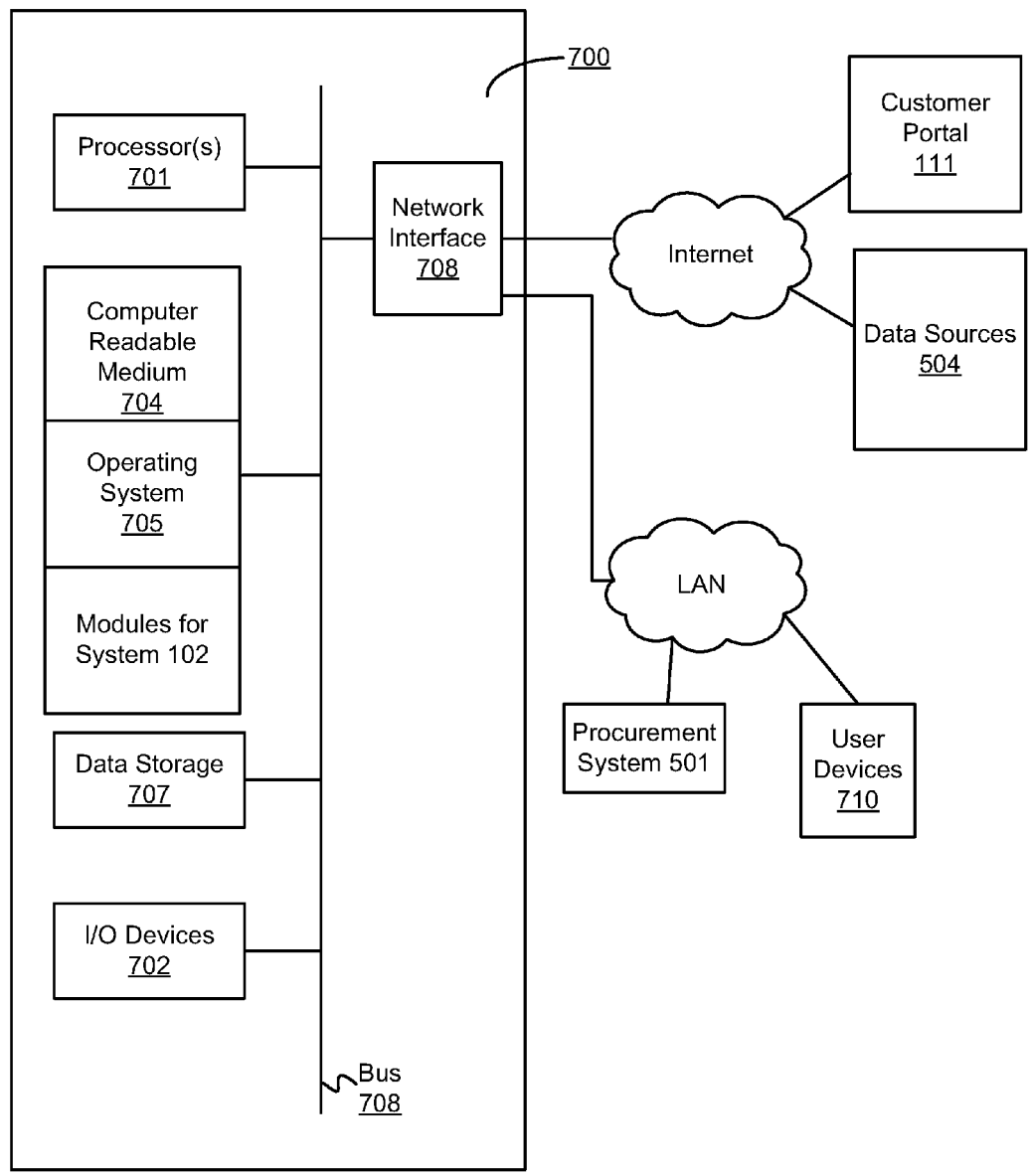
FIG. 7 shows a computer system that may be a platform for a system, according to an embodiment.

FIG. 7 illustrates a computer system 700 that may be used to implement the system 100/502. It is understood that the illustration of the computer system 700 is a generalized illustration and that the computer system 700 may include additional components and that some of the components described may be removed and/or modified. Also, the system 100/502 may be implemented in a distributed computing system, such as a cloud computer system. For example, the computer system 700 may represent a server that runs the system 100/502 or the computer system 700 may comprise one of multiple distributed servers that performs functions of the system 100/502.

The computer system 700 includes processor(s) 701, such as a central processing unit, application specific integrated circuit (ASIC) or other type of processing circuit; input/output devices 702, such as a display, mouse keyboard, etc.; a network interface 707, such as one or more interfaces for connecting to a Local Area Network (LAN), a wireless 802.11x LAN, a 7G or 4G mobile WAN or a WiMax WAN, or other type of network; and a computer readable medium 704. Each of these components may be operatively coupled to a bus 708. The computer readable medium 704 may be any suitable medium which participates in providing instructions to the processor(s) 701 for execution. For example, the computer readable medium 704 may be non-transitory or non-volatile media, such as a magnetic disk or solid-state non-volatile memory or volatile media such as RAM. The instructions stored on the computer readable medium 704 may include machine readable instructions executed by the processor(s) 701 to perform the methods and functions of the system 102.

The computer readable medium 704 may store an operating system 705, such as MAC OS, MS WINDOWS, UNIX, or LINUX, and one or more applications, which can include the modules for the system 502. The operating system 705 may be multiuser, multiprocessing, multitasking, multithreading, real-time, etc.

The computer system 700 may include a data storage 707, which may include non-volatile data storage. The data storage 707 stores data used by the system 502. The data storage 707 may be used for the data repository 110 or the computer system 700 may be connected to a database server (not shown) for providing the data repository.

The network interface 708 connects the computer system 700 to the procurement system 501, for example, via a LAN. End user devices 710 and other computer systems/servers may also connect to the computer system 700 via the LAN and network interface 707. Also, the network interface 707 may connect the computer system 700 to the Internet. For example, the computer system 700 may connect to customer portal 111 and data sources 504 via the network interface 707 and the Internet.

Figure 8:
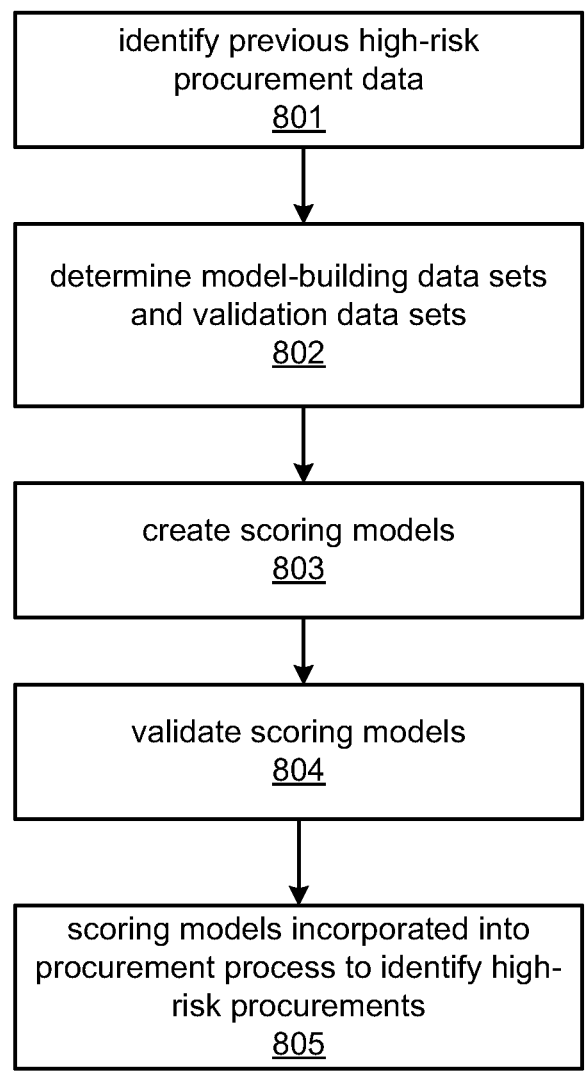
FIGS. 8-11 illustrate flow charts of methods, according to embodiments.

FIG. 8 illustrates a method 800 according to an embodiment for identifying procurements that are determined to have a likelihood of being high-risk. The method includes incorporating historical information gained from previous high-risk procurements and generates scoring models, including the classifiers 106, that can be used to evaluate (e.g., in a substantially real-time environment) potential procurements that are underway. Real-time refers to system processing capabilities that are fast enough so as not to adversely interfere with a use of system 100/502 by a user. The method 800 and other methods and functions described herein may be performed by the system 100/502 or may be performed in other systems.

At 801, data for previous high-risk procurements is identified. The identification of these procurements may be done through audits performed through a computer system and/or using machine-implemented expert analysis. The specific characteristics of procurements are stored in a database along with the timeframe of the procurement action. These characteristics may be the variables used in the scoring models to determine if a bid is high-risk. The variables may be related to the price of procuring items, the supplier of the items, the items themselves, etc.

At 802, model-building data sets, such as training sets 103, and validation data sets, such as validation sets 105, are determined from historic procurement data including the identified high-risk procurements. Portions of the procurement data may be in both types of data sets to allow for development and confirmation of the models. Data mining techniques that can be used for creating the training sets 103, the validation sets 105, and scoring models may use both procurements that were problematic (high-risk), along with those that were not (non-high-risk, or low-risk, procurements).

At 803, the scoring models are created from the model building data sets. For example, machine learning functions 104 use the training sets 103 to train the classifiers 106. For example, logistic regression, neural networks analysis, decision trees, data mining regression, gradient boosting, bootstrapping, and ensemble (a method that combines the predictions from the individual models) are techniques that can be used to build the scoring models, which can include the classifiers 106. Characteristics (e.g., variables) that have the greatest predictive power are determined and incorporated into the models and are used to determine a probability that a given procurement would be high-risk.

For example, one factor that might indicate an increased probability that a high-risk procurement has been identified includes a procurement price/nomenclature relationship that exceeds the bounds of a commercially available price/nomenclature relationship. This factor may be constructed by combining data from an organization's procurement system with data from commercial sourcing pricing/nomenclature tables.

Table 1, below, illustrates a manner in which the data may be compared. The data gleaned from this comparison could create an index value (e.g. Bid/Should Cost High Value) that is a factor to be considered in the high-risk identification process.

TABLE 1

Using Outside Data to Compare for Price Reasonableness

| Data From EBS | | | | External Data |
|---|---|---|---|---|
| Bid Received | | Should Cost | | |
| | PR Price | Low | Median | High | |
| Ice Cube Tray | $20.00 | $0.50 | $1.25 | $2.00 | Ice Cube Tray |

The factor data is used to build the scoring model used to identify a high-risk procurement. When that operation is complete, the model or models chosen can then be adjusted based on how sensitive the prediction of a high-risk procurement is selected to be. A more sensitive model may highlight more procurements as high-risk, including those that might not represent ones that are truly high-risk (false positives). A less sensitive model may identify fewer procurements as high-risk, but may run a greater probability that an otherwise high-risk procurement won't be identified as such. Embodiments allow tuning models with respect to sensitivity so that a desired degree of accuracy is obtained with respect to identifying potential procurements as high-risk.

Multiple scoring models may be created at 803 to accommodate different areas of risk. For example, a price risk scoring model, a supplier risk scoring model and an item risk scoring model may be generated using a price risk data set, a supplier risk data set, and an item risk data set, respectively. Respective data sets may contain information relevant to particular risk area. The data may include information associated with variables for each risk areas. Also, respective models may be generated using different model building techniques. If desired, respective models may use a common scoring scale and scoring threshold to identify high-risk procurements, as is further described below.

The price risk scoring model may be used to identify bids that are over-priced or bids that are underpriced. For example, an underpricing threshold can be determined and bids below the threshold may be labeled significantly underpriced bids. Significantly underpriced bids may be indicative of the supplier using, for example, counterfeit goods or goods made with inferior materials and thus may be considered high-risk. The price risk scoring model may be comprised of historic price data for a period of time, e.g., the last 12 months and beyond, for goods or services being procured. The price risk model may also include variables to adjust for economic conditions. For example, the variables may include a consumer price index (CPI), a producer price index (PPI) for commodities and a PPI for industries and other variables that may account for inflation or other economic conditions. The price risk scoring model identifies the "should cost" amount for items being procured.

Certain factors may be used to select the variables for the price risk scoring model. For example, commodity inflation factor data sources may be evaluated to select the inflation variable that is most relevant to the item being procured. The inflation rate may vary widely depending on the type of item being procured and an inflation rate may be selected that is for a particular type of item being procured. Geographic location, and shipping costs are examples of other variables that may be used to adjust prices or costs.

The supplier risk model includes variables that are used to identify high-risk suppliers of items being procured. The variables may vary depending on the type of item being procured and the variables may include geographic location, out-of-business indicators, legal status (e.g., corporation, partnership, sole proprietor, etc.), year started, number of employees, past procurement history with regard to supplying of items, etc. In one example, cluster analyses is performed to determine the association of each variable against the supplier being evaluated as well as a level of multicollinearity amongst the variables. Through a number of model iterations, a set of variables are selected which not only minimize multicollinearity, but are also able to accurately distinguish which suppliers are high-risk. A logistic regression may be used to identify suppliers that have a high probability of being high-risk based on the supplier risk model.

The item risk model includes variables that are used to identify high-risk items that may be supplied by a supplier for a procurement. The item risk scoring model may be used to identify bids that are high-risk based on the items being supplied by the supplier for the procurement. For example, a bid may be considered high-risk if the items being supplied by a supplier are expected to have a high probability of being counterfeit. Some examples of variables that may be used in the item risk model may include commonality of a unit in the bid specifying the amount of the item to be supplied, the type of item (e.g., microprocessors may be considered higher risk than a fastener), geographic location of manufacturing of the item, the use of the item (e.g., military versus civilian), past supplier history with respect to providing items, etc.

At 804, the scoring models may be validated by evaluating the validation data set using the models to confirm accuracy. Validating models may also protect against model over-fit, which is a condition where the model places more emphasis on a variable than might be found in the larger population of procurements in which the model could be run. Model validation ensures that the model will operate as desired when run against live data as part of an automated procurement process.

At 805, the scoring models are incorporated into the procurement process to identify high-risk procurements. The scoring models, for example, may be incorporated into an automated daily review of procurements. For example, the scoring models are used to evaluate bids that may be high-risk and may generate alerts when a bid is determined to be high-risk.

Bids may be evaluated using the price risk scoring model, the supplier risk scoring model and the item risk scoring model to identify high-risk procurements. Also, evaluation capacity may be considered when evaluating bids using the models. The evaluation capacity is a number of bids that can be reviewed within a predetermined time period. The evaluation capacity may be based on an operating capacity of a system, such as system 100/502, for selecting one or more bids for procuring one or more items. In situations where an evaluation capacity is anticipated to be inadequate to process in incoming number of bids, filtering may be used to reduce the number of bids evaluated by system 100/502. Alternatively, system capacity can be expanded using, for example, cloud-based deployments to increase system capacity to process an anticipated number of incoming bids.

The evaluation of bids may include determining a price risk score, a supplier risk score and an item risk score for each bid based on the models and the evaluation capacity and the information associated with each bid. The same scoring scale (e.g., 0-1000) may be used for each type of score, e.g., price risk, supplier risk, and/or item risk score. Also, the same threshold in the scoring scale may identify a bid as a high-risk. For example, if the threshold is 800, a price risk score, a supplier risk score and/or an item risk score greater than or equal to 800 for a bid may indicate the bid is high-risk. Use of a single, or consistent, scoring scale and/or scoring threshold for each risk area may facilitate quickly identifying which bids are high-risk. Bid evaluations are further described with respect to the methods discussed below.

Figure 9:
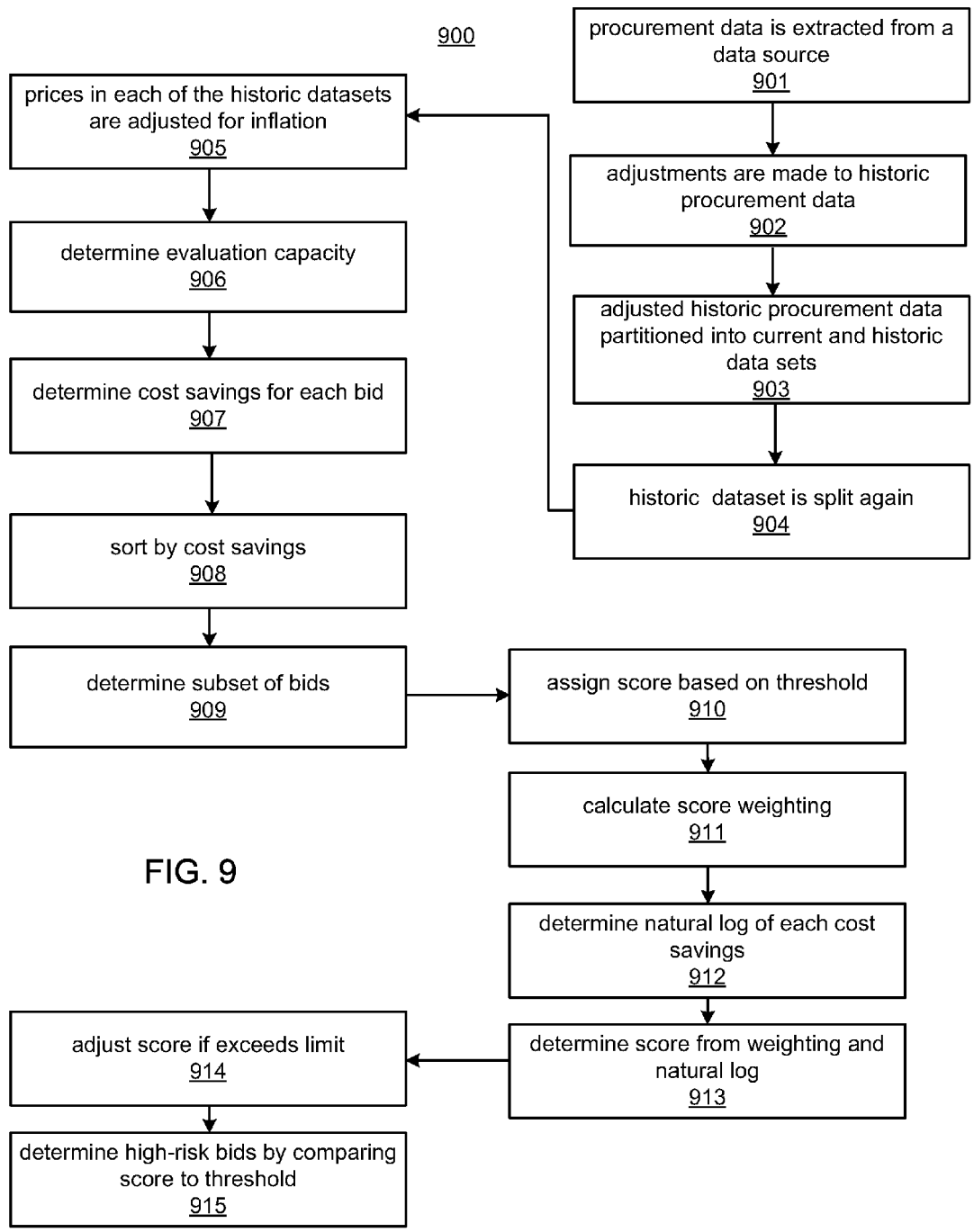

FIG. 9 illustrates a method 900 for determining high-risk bids for a procurement with respect to price, including generating a price risk model comprised of "should cost" prices for items being procured and for scoring prices provided in bids according to the model. Should cost data can be used to reduce or eliminate the risk that a procuring entity will overpay for an item. For example, the price risk model may be used to identify and flag overpriced bids. Such bids may be identified after determining a "should cost" price for each item being procured. At 901, procurement data is extracted, for example, from a data source. For example, six years of historic procurement data may be extracted in one embodiment; however, other embodiments can extract procurement data over other time periods.

In order to determine a suitable "should cost" price for each item, adjustments are made to historic procurement data at 902. For example, certain items may not be procured through a procedure where bids are received to supply these items, and as a result, there may be minimal correlation between predictive variables and target variables for these items. Examples of such items may include general merchandise, medical, and subsistence procurements. Procurements for these types of items may be removed from the historic procurement data. Also, items procured through long-term contracts may be removed from the historic procurement data due to the differing procedure for acquiring these items. Following this, instances where the net price of a procurement was missing or equal to zero are also removed as well as instances where the net price associated with a procurement represented an extreme outlier. For example, in a first pass (Pass 1), such outliers were identified as those procurements with a net price greater than four times the median price for a particular item. A second pass (Pass 2) of outlier exclusion may also be applied. For example, Pass 2 utilizes different thresholds of the historic price coefficient of variation based on the median price of an item. For example, if the median price of an item is between $7 and $1000 and the coefficient of variation is above 40, this record would be deemed an outlier and subsequently removed from the "should cost" calculation.

At 903, the adjusted historic procurement data is partitioned into current and historic data sets. For example, the adjusted historic procurement data is split into two datasets representing a current dataset, which included all procurements taking place in the most recent twelve months of procurement data, and a historic dataset, which includes the remaining approximately five years of procurement history. The current dataset is treated as if such procurements are incoming bids and the expected cost savings are calculated against the actual price paid.

At 904, after separating the current and historic datasets, the historic dataset is split again. For example, a first historic dataset contains items for which only two or fewer procurements occurred within the five year time period contained within the historic data set, and a second historic dataset contains items for which greater than two procurements took place over the same period. Due to the scarcity of procurement pricing history for those items with two or fewer purchases, the methodology for determining a "should cost" price differs from those items for which a richer pricing history exists.

At 905, prices in each of the historic datasets of 904 are adjusted for inflation to determine a "should cost" price for each item, and the "should cost" price may be entered into "should cost" tables for items. For example, in order to account for the effects of inflation on price, the Consumer Price Index (CPI) and the Producer Price Index-Industry (PPI-I) are both applied. Since CPI measures the amount of inflation experienced by the consumer for a basket of goods and PPI-I measures the amount of inflation experienced by producers in the profits that they gain from the sale of their goods and can be disaggregated by industry using NAICS (North American Industry Classification System) codes, using both indices may provide a better adjustment for inflation than using a single index. More specifically, using both CPI and PPI-I, disaggregated by industry using NAICS codes, allowed the Price Risk model to account for the variances in inflation factors that may occur between industries by mapping each item's NIIN (National Item Identification Number) code to an associated NAICS code.

Application of CPI and PPI-I to adjust for inflation may differ between the two historic datasets determined at 904. For those items procured more than two times, CPI and the appropriate industry-specific PPI-I values for the month in which the procurement took place are averaged. Using the resulting index, the net price for each item was inflated to the "current" month, after which all of the inflation adjusted net price values were averaged by NIIN in order to produce a NIIN-specific "should cost" price. For those items with a sparse procurement history (e.g., two or less), the appropriate CPI and PPI-I index values used to inflate the procurement's net price to current values are applied separately. The values for each procurement obtained using this method are then averaged, as if they represented their own individual price points, in order to produce a NIIN-specific "should cost" price for those items with two or fewer purchases in the five years of historic procurement data. The "should cost" price represents an estimation of how much should be paid for an item being procured based on historic price data for the item or related items and other variables.

After the "should cost" item prices are determined, the bids may be scored according to the "should cost" price of the items in the bid, as is discussed further below. The price risk scoring model identifies bids that are high-risk based on price. A high-risk price may represent overpayment for a good or service if accepted. Also, a significantly underpriced bid may be considered high-risk. For example, a bid three times less than an average price may be indicative that the supplier is using counterfeit goods.

At 906, the evaluation capacity is determined. The evaluation capacity may be entered by a user and stored in the data repository 603, and the evaluation capacity may be retrieved as needed.

At 907, a cost savings is determined for each bid. The cost savings may be based on the difference between the "should cost" and the price specified in the bid to procure an item. If the price is per item and multiple items are being procured, then the difference may be multiplied by the number of items being procured.

At 908, the bids are sorted by cost savings, for example from highest cost savings to lowest cost savings. At 909, a subset of the bids having the highest cost savings are determined. The number of bids in the subset may be based on the evaluation capacity. For example, if the evaluation capacity is 200, then 200 bids with the most cost savings is determined and may be selected based on the determination.

At 910, a score, according to the scoring threshold in the scoring scale, is assigned to the bid in the subset that is associated with the lowest cost savings. For example, if the scoring threshold is 800, then the bid in the subset with the lowest cost savings is assigned a score of 800.

At 911, a score weighting is calculated. For example, an embodiment may calculate the score weighting by taking the natural log of the cost savings for the lowest cost savings bid and then dividing it by the threshold, e.g., 800.

At 912, the natural log of the cost savings for each bid in the subset is determined. At 913, the weighting, determined at 911, is applied to the natural log of the cost savings for each bid, determined at 912, to determine each bid's score. For example, the natural log, determined at 912, is multiplied by the score weighting, determined at 911, for each bid.

At 914, the scores may be adjusted if a limit is exceeded. For example, any score over an upper limit of the scoring scale (e.g., 1000 on a scoring scale of 0-1000) is assigned to the upper limit, and any score below the lower limit (e.g., 0) is assigned the lower limit for the score.

At 915, the score for each bid is compared to the scoring threshold to determine if the bid is high-risk. For example, if the bid's score exceeds the threshold it is marked as high-risk and a notification may be generated for example via the dashboard 614 or message may be sent to a bid evaluator.

Figure 10:
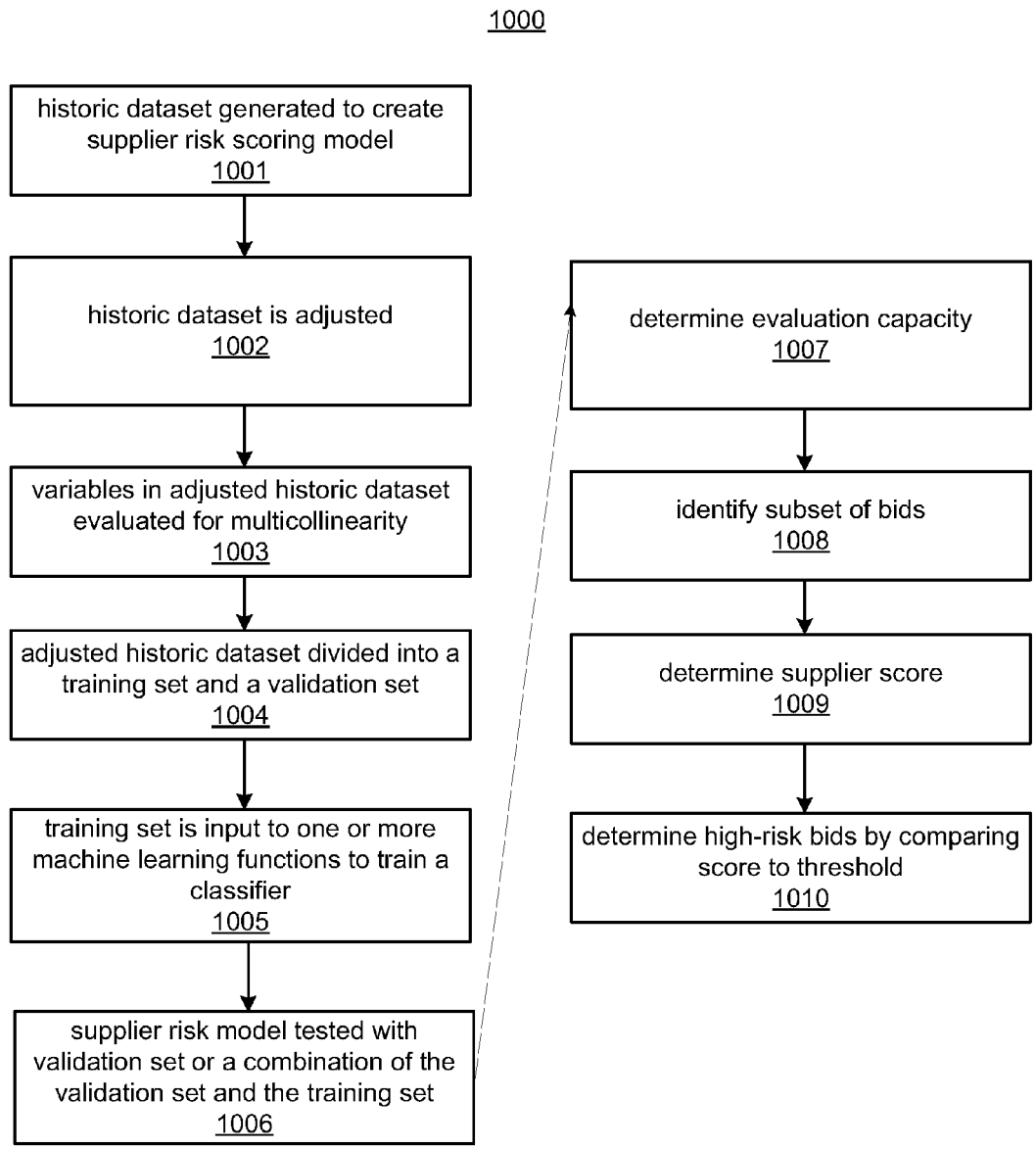

The supplier risk model is designed to identify high risk suppliers submitting bids for a procurement. In this way, it can help reduce the quantity of bids awarded to suppliers who may provide counterfeit or non-conforming items or that are unlikely to fulfill their contractual obligations. FIG. 10 illustrates a method 1000 for evaluating bids according to a supplier risk scoring model, and may be used to identify bids having a high-risk supplier. The supplier risk scoring model may be used to identify bids that are high-risk based on the supplier of the items being procured. For example, some suppliers may be considered "bad actors" based on previous procurement actions. For example, the supplier may have previously been found to provide counterfeit goods or was accused or indicted for fraud. Bids from these types of suppliers may be considered high-risk.

At 1001, a historic dataset is generated for use to create the supplier risk model. For example, supplier names are extracted from approximately six years of historical procurement data. Those suppliers are matched against information from multiple data sources to collect additional information about the suppliers, including demographic information, and include the additional information in the historic data set.

At 1002, the historic dataset is adjusted. For example, a quality check may be applied to sources of the historic data set. Based on the quality check, it may be determined that variables are deemed unusable due to a high rate of missing data and/or no variation in values. Unusable variables may be removed from consideration as potentially predictive variables. Each variable with an acceptable rate of missing values may be improved, for example, by replacing the missing values of the variable with either the mean or the median of the values for the variable depending upon the variable under consideration. Also, additional variables may be created, for example, by combining or modifying original variables.

At 1003, variables in the adjusted historic dataset are evaluated for multicollinearity. For example, a factor analysis can be performed to mitigate effects of highly correlated predictive variables. In the process, variables that are highly correlated with each other are combined into a single variable which can then be used by one or more of the machine learning functions 104 to train a classifier without the consequences of multicollinearity, as long as those factors do not correlate with other variables.

At 1004, for example, after performing factor analysis on the adjusted historic dataset, the adjusted historic dataset is divided into a training set and a validation set. The training set includes labeled data objects for supervised training of a classifier. Factor analysis may be performed again on the training set.

At 1005, the training set is input to one or more of the machine learning functions 104 to train a classifier. In an example, a step-wise logistic regression function may be used to generate the supplier risk model, which may be a classifier. At 1006, the supplier risk model is tested using one or more of the validation set and a combination of the validation set and the training set. After proven to be accurate through the testing, the supplier risk model may be used to classify data objects, such as data objects in the current set as is discussed below. The supplier risk model may be adjusted depending on the type of items being procured. For example, the supplier risk model may include a geographic location of the supplier as a variable. The variable may be weighted differently depending on the type of item being procured and/or where a supplier is located.

At 1007, the evaluation capacity is determined. The evaluation capacity may be received by system 100 on behalf of a user and stored, for example, in the data repository 603, and retrieved as needed.

At 1008, a subset of bids are identified based on the evaluation capacity. For example, the subset may be determined based on cost savings and the evaluation capacity as described in the method 900.

At 1009, a supplier score is determined based on the supplier risk model for each bid. For example, the supplier risk model determines a probability that a bid includes a high risk supplier. In one example, business rules may be used to determine the supplier risk score based on the probability. For example, if the supplier is determined to be on a barred list for the procurement, the bid is given the maximum score of 1000.

At 1010, the supplier risk score for each bid is compared to the scoring threshold to determine if the bid is high-risk. For example, if the bid's supplier score exceeds the threshold it is marked as high-risk and a notification may be generated for example via the dashboard 614 or message may be sent to a bid evaluator.

Figure 11:
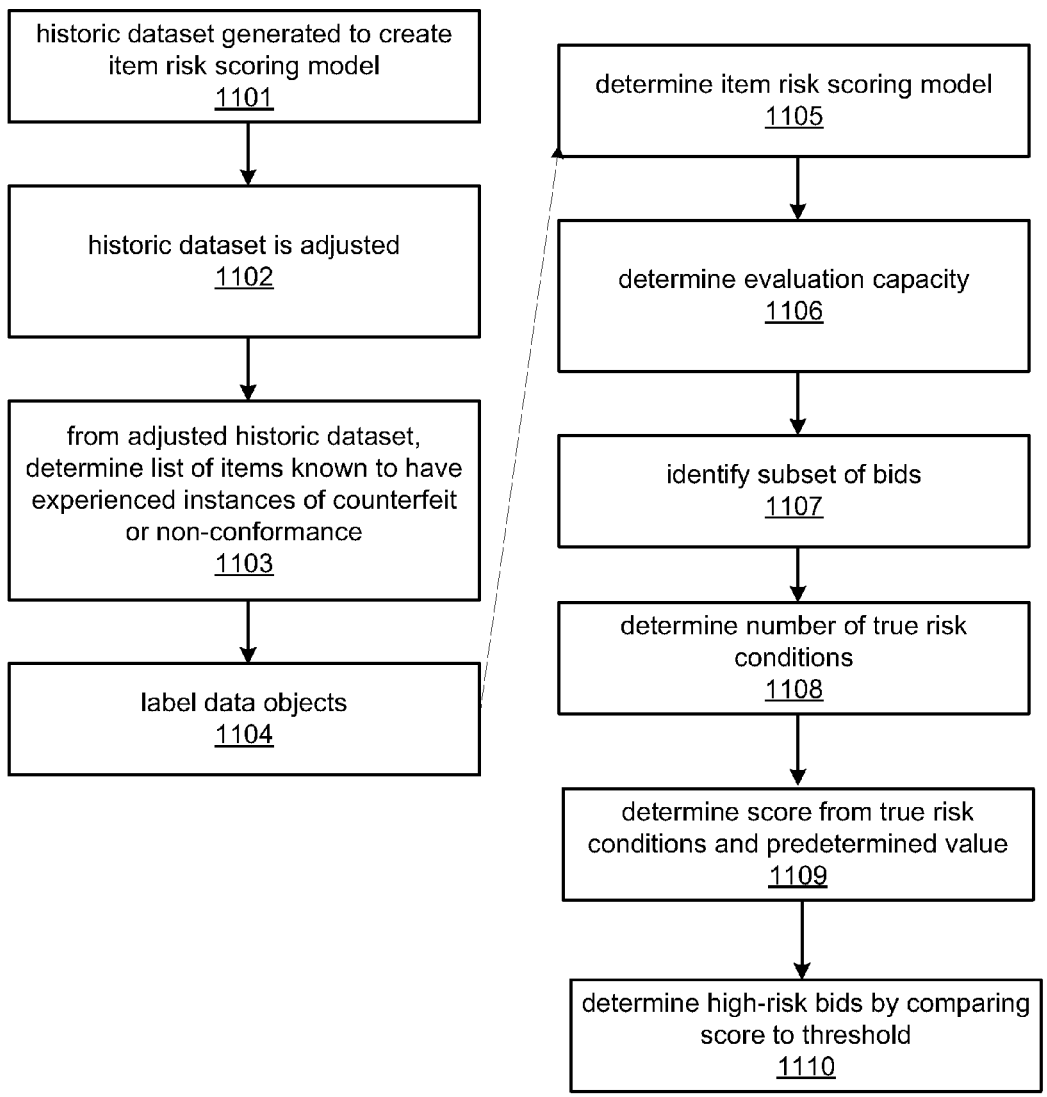

FIG. 11 illustrates a method 1100 for evaluating bids according to an item risk scoring model and to identify bids that may be associated with providing high-risk items. For example, the item risk scoring model may be used to identify bids that are high-risk based on the items being supplied by the supplier for the procurement. The item risk model is used to identify items that may more likely be counterfeit or otherwise non-conforming with respect to a procurement request. For example, a bid may be considered high-risk if the items being supplied by a supplier are estimated to have a high probability of being counterfeit or non-conforming.

At 1101, a historic dataset is generated to create the item risk model. For example, the historic dataset includes approximately six years of historic procurement data. A list of items previously purchased over the last six years is determined from the historic procurement data. The historic dataset may include data from multiple sources.

At 1102, the historic dataset is adjusted. For example, general merchandise items, which may be identified through NIIN codes or other item codes, are filtered from the historic data set.

At 1103, from the adjusted historic dataset, a list of items known to have experienced instances of counterfeit or non-conformance is determined. For example, failure reports, defect codes, contractor fault reports and other information may be used to identify the items that were counterfeit or non-conforming.

At 1104, the list of items from 1103, which are determined to have experienced instances of counterfeit or non-conformance, are used to label data objects in the adjusted historic data set from 1102 as high risk items to create a training set. Also, predictive variables are determined for the item risk model. For example, variables, such as the number of instances an item was purchased over the past six years, an indicator of an item's criticality, and whether the item had a diminishing manufacturing source are selected as predictive variables.

At 1105, the item risk model is determined. For example, an ensemble classifier is generated for the item risk model. In an embodiment, a combination of a decision tree function, a correlation analyses function and Chi-squared tests are employed to determine variable importance, multicollinearity and the weights for each variable to create the ensemble classifier. For the decision tree function, variables selected as predictive variables are input to the decision tree. The decision tree output identifies group values of continuous variables that have the greatest predictive power, and the groups are transformed into categorical variables and included in further decision tree iterations as well as in Chi-squared tests, which are performed in to assign weights to the rules relating to the predictive variables used for the final classifier. The item risk model may be stored in data storage and may be retrieved to evaluate bids. The item risk model may be adjusted depending on the type of items being procured.

At 1106, the evaluation capacity is determined. The evaluation capacity may be received on behalf of a user and stored. At 1107, a subset of bids are identified based on the evaluation capacity. For example, the subset may be determined based on cost savings and the evaluation capacity as described above. At 1108, a number of true risk conditions is determined for each bid. For example, variables in the item risk model may represent risk conditions, such as whether the bid contains an uncommon unit, whether the bid is for supplying a microprocessor, whether manufacturing is performed overseas, etc. Examples of assigning true conditions for these variable may include, if the unit in the bid is uncommon it is assigned a "1" (i.e., a true risk condition), otherwise it is assigned a "0". If the item is a microprocessor, the bid is assigned a "1". If the item is manufactured overseas, the bid is assigned a "1". The total number of true risk conditions are determined for each bid.

At 1109, the number of true risk conditions is multiplied by a predetermined value to determine an item risk score in the scoring scale for each bid in the subset. The predetermined value may be based on the scoring scale used. At 1110, the item risk score for each bid is compared to the scoring threshold to determine if the bid is high-risk. For example, if the bid's supplier score exceeds the threshold it is marked as high-risk and a notification may be generated for example via the dashboard or message may be sent to a bid evaluator.

Figure 12A:
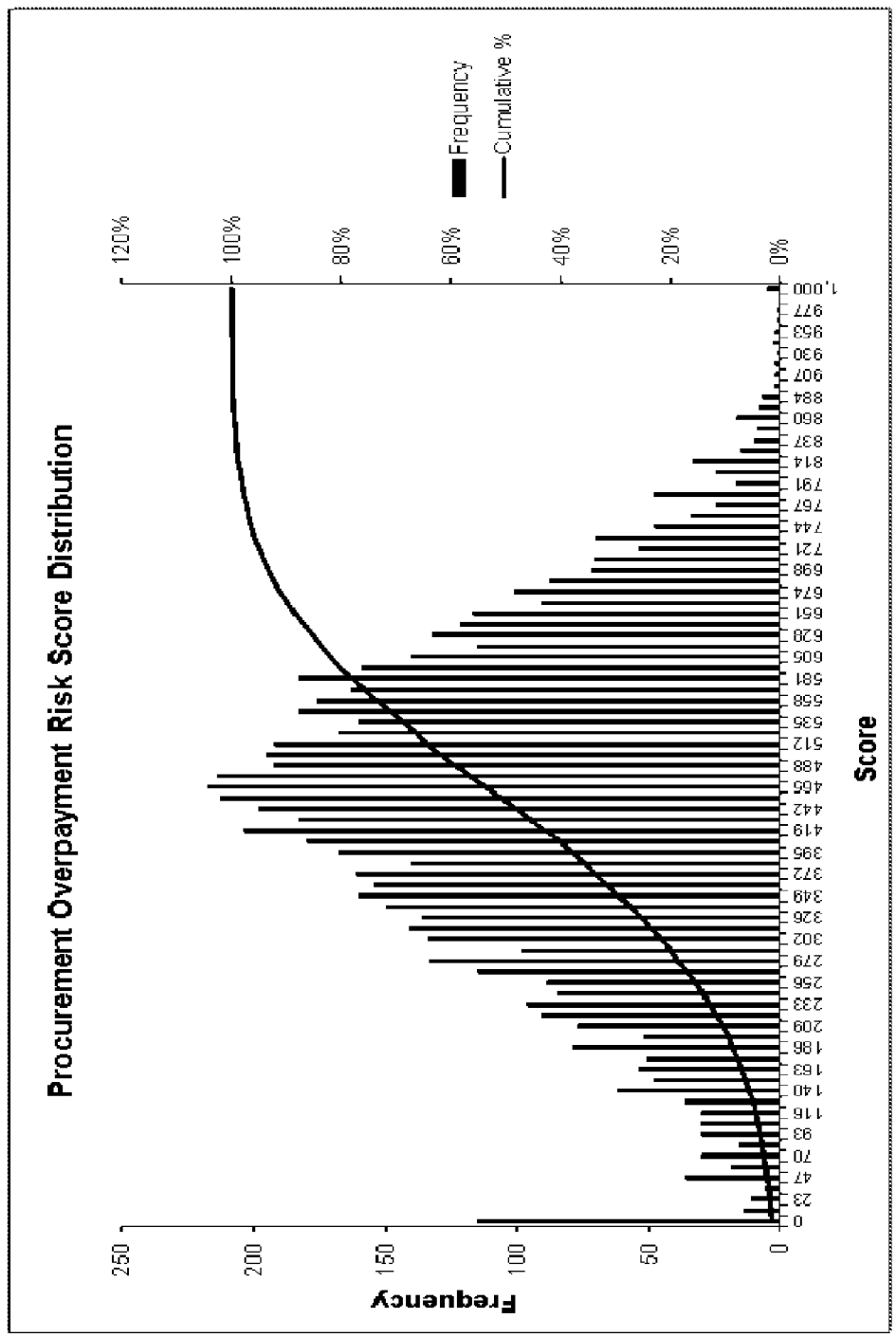
FIGS. 12A-C show examples of price risk scores, supplier risk scores and item risk scores on a scoring scale, according to embodiments.
Figure 12B:
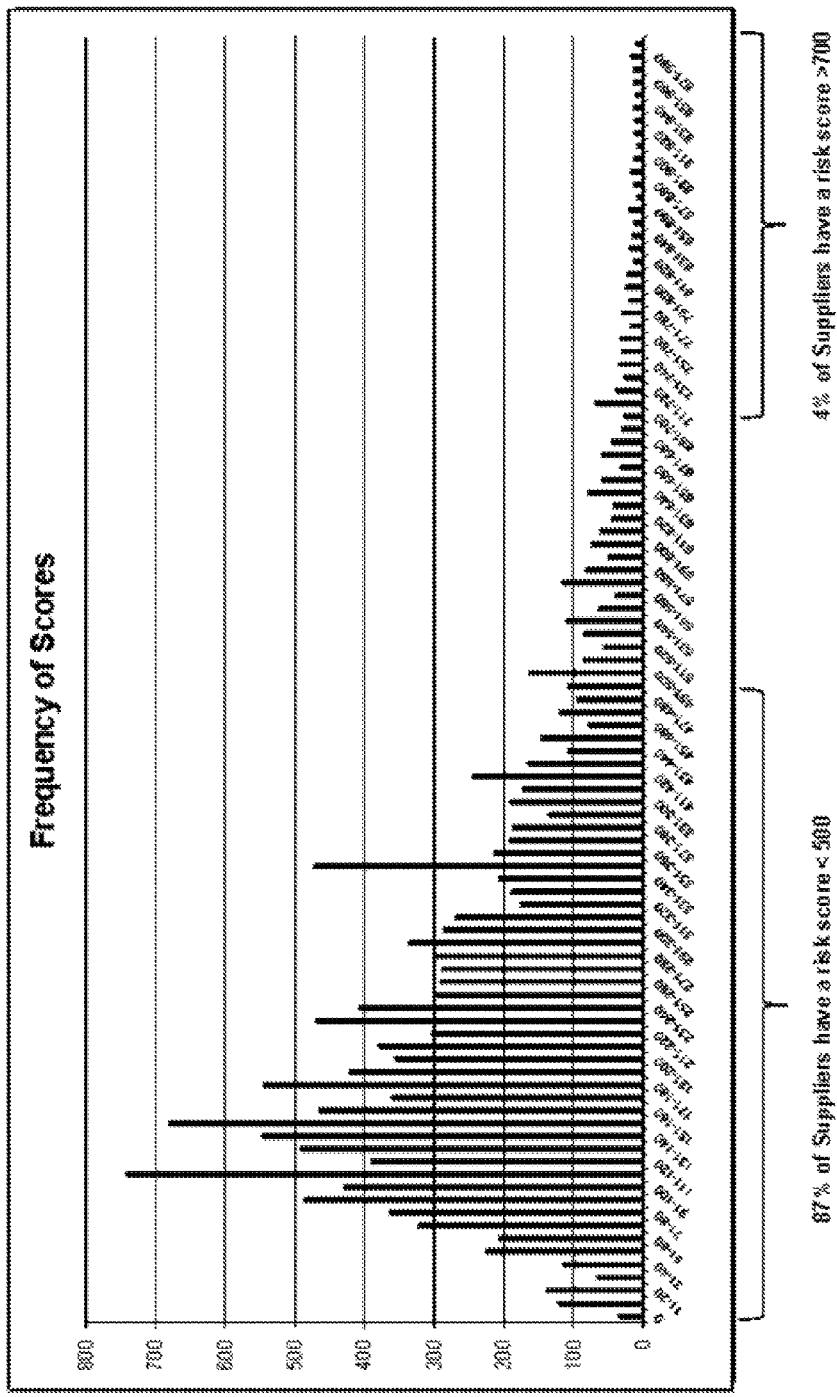
Figure 12C:
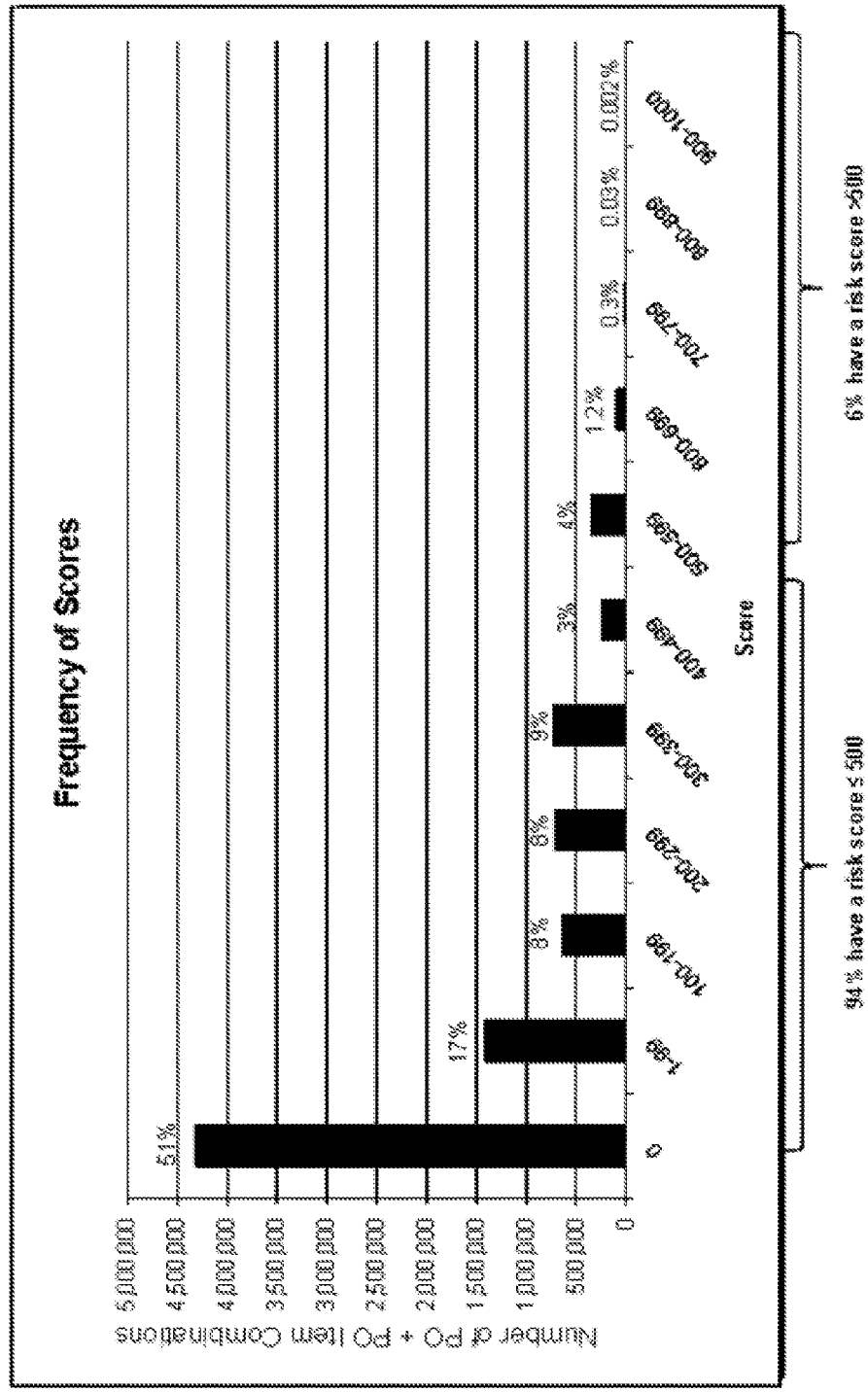

FIGS. 12A-C show examples of price risk scores, supplier risk scores and item risk scores on the scoring scale from 0-1000. FIG. 12A shows the frequency of the price risk scores for bids for a procurement. FIG. 12A also shows a curve representing the cumulative frequency. If the threshold is 700, the number of bids that exceed the threshold, which may be considered high-risk, is relatively small when compared to the total number of bids. FIG. 12B shows the frequency of the supplier risk scores for the bids of the procurement. In this example, 4% are considered high-risk if the threshold is 700. FIG. 12C shows the frequency of the item risk scores for the bids for the procurement, namely that 6% are greater than 500 and an even smaller percentage are greater than 700.

The dashboard 614 may generate screenshots of the scores determined by the system 502. Examples of the screenshots are described with respect to FIGS. 13-17. Also, scores may be selected to provide drill downs to display additional information related to the scores. FIG. 13 shows an example of a screenshot illustrating scores for bids provided by the fictitious companies James Brother Construction, Quincy Engineering and F&T Sales and Service. The scores are 967, 810 and 930. In this example, only the highest score is shown but multiple scores may be generated for each bid, such as a price risk score, a supplier risk score and an item risk score. As shown, 967 and 930 are price risk scores and 810 is a supplier risk score. Also, the company, the score or the risk factor may be selected by a user for drill downs to get additional information on the selected item.

Figure 14:
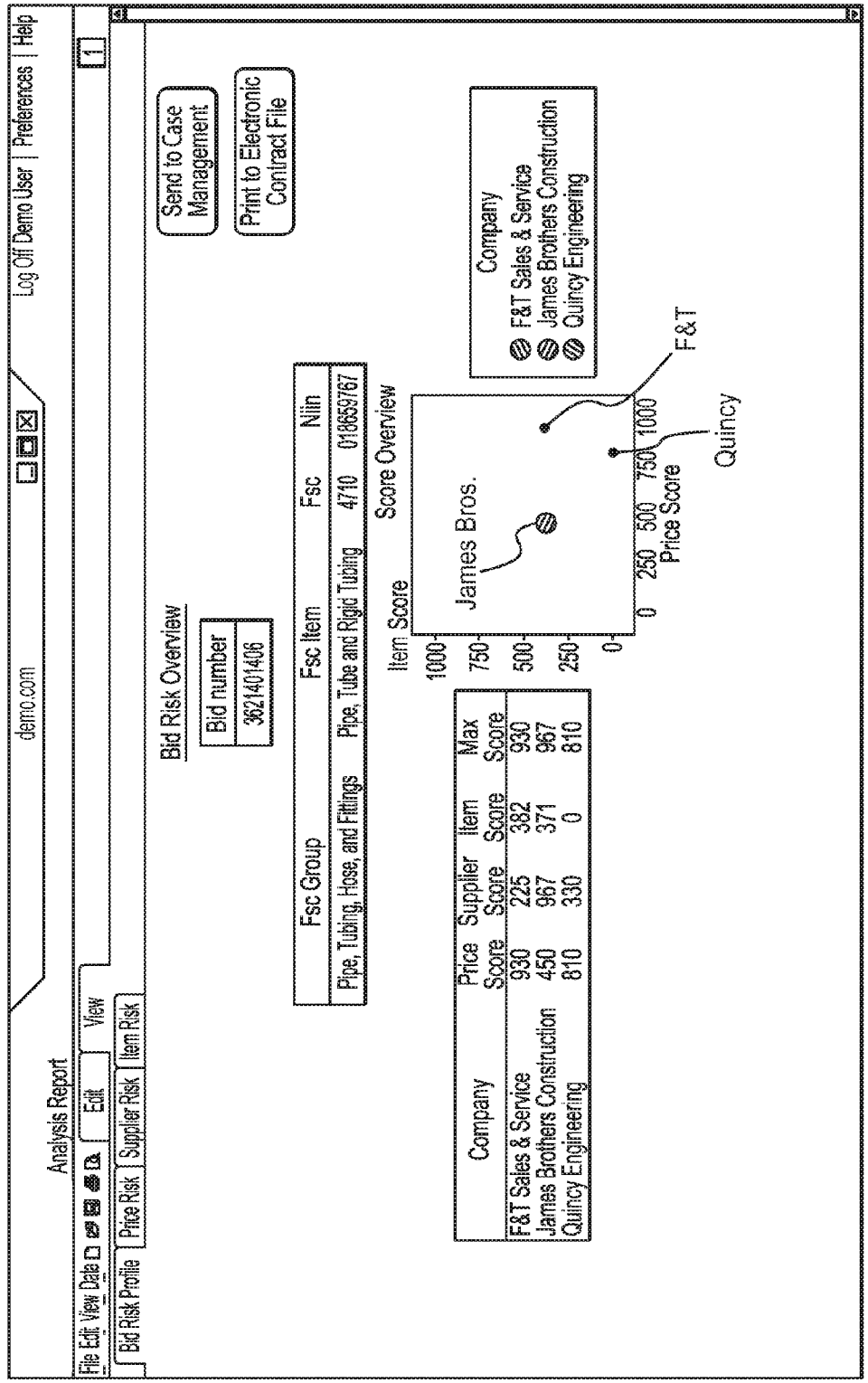

FIG. 14 illustrates an example of a screenshot showing a bid risk profile. The price risk score, a supplier risk score and an item risk score are shown for each company, along with respective maximum scores. If 800 is the threshold, the bids for all these companies may be considered high-risk because the maximum scores exceed the threshold. A graphic representation of the maximum scores may also be provided as shown. FIG. 14 also shows a graphic representation of the score overview for the three bids based on item and price score. The graphic representation of the score overview allows a user to quickly identify which is the best bid in terms of the item and price scores in this example. For example, James Brothers is shown as having the best scores in terms of item and price.

Figure 15A:
Figure 15B:
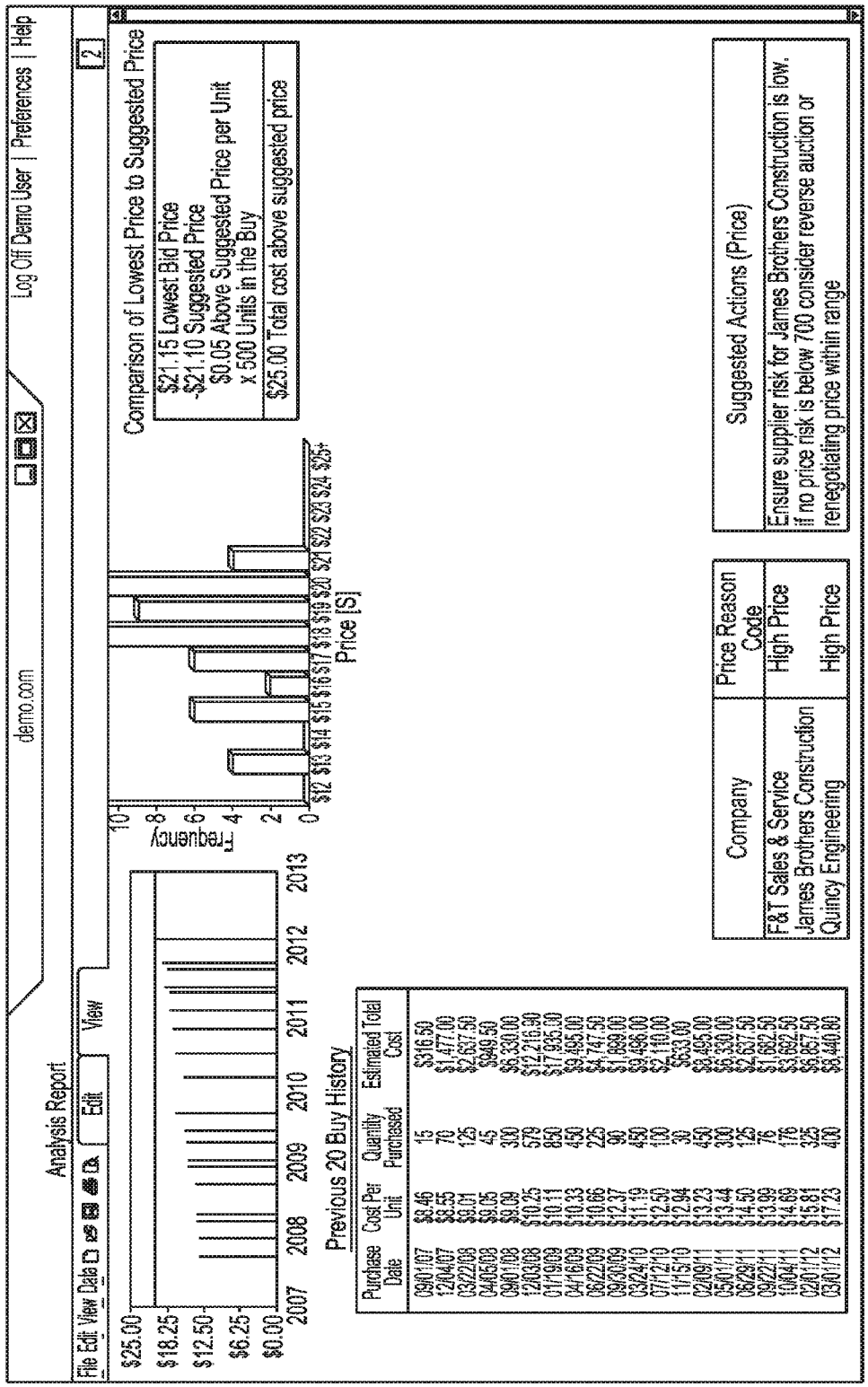

FIGS. 15A-B show an example of a screenshot for a price risk drill down. FIGS. 15A-B show the same screen but it is scrolled down in FIG. 15B to show the features that are not viewable in FIG. 15A. A similar format is used for FIGS. 16A-B. As shown in FIG. 15A, scores are provided for each company. If a score is above the threshold, it may be identified using a technique, such as color coded red, displayed in a font that differs from other fonts on the screen, using bold text, etc., or another alert may be generated to indicate it is high-risk. FIG. 15A shows information related to historical price data for the item being procured, such as a time-phased history, a frequency of historical prices and a previous buy history for the item. FIG. 15A also shows a comparison of the lowest bid price, which is provided by James Brother Construction, to the suggested or should cost price. FIG. 15B shows examples of notes and suggested actions. The system 502 may determine the suggested actions based on the scores.

Figure 16A:
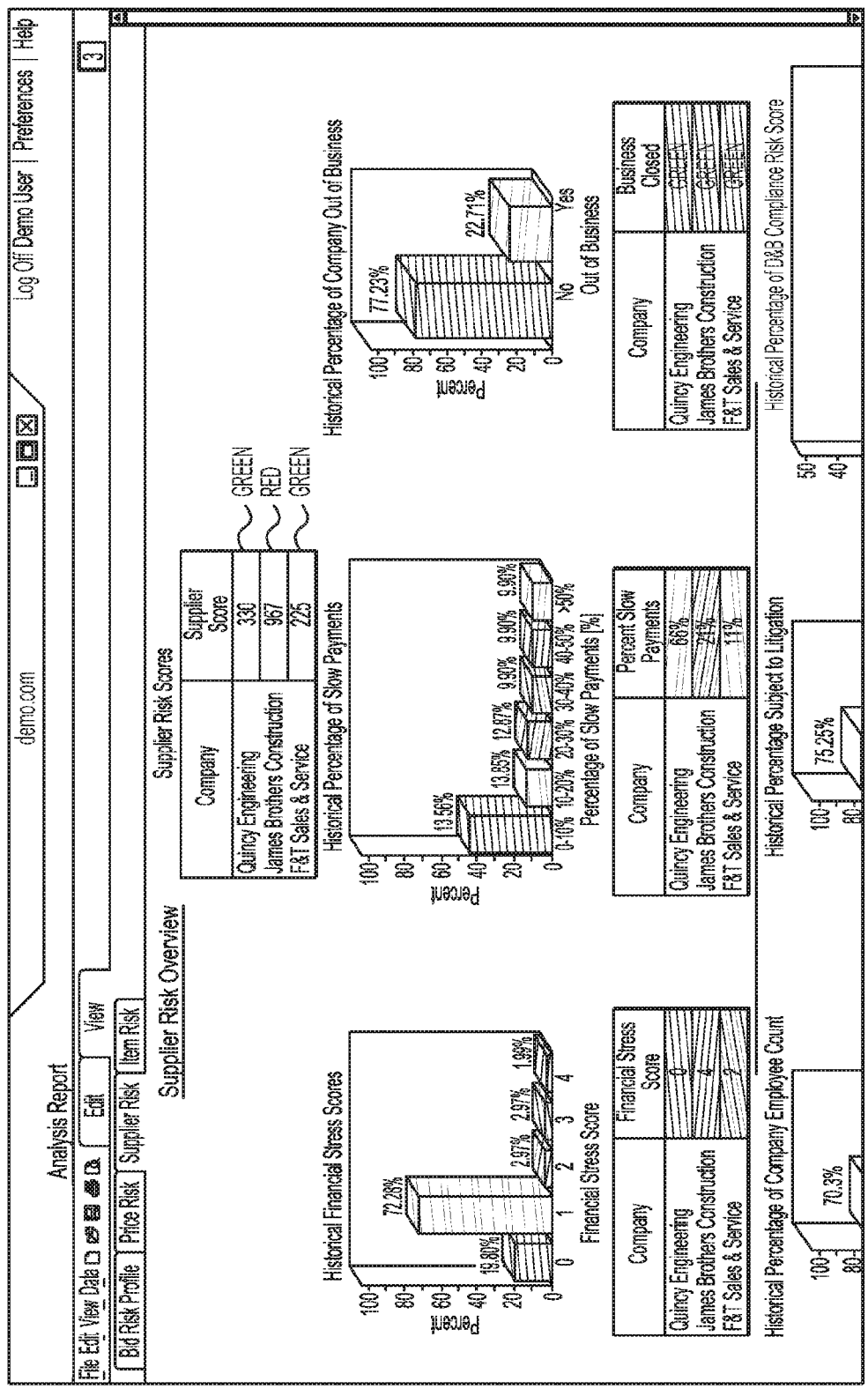
Figure 16B:
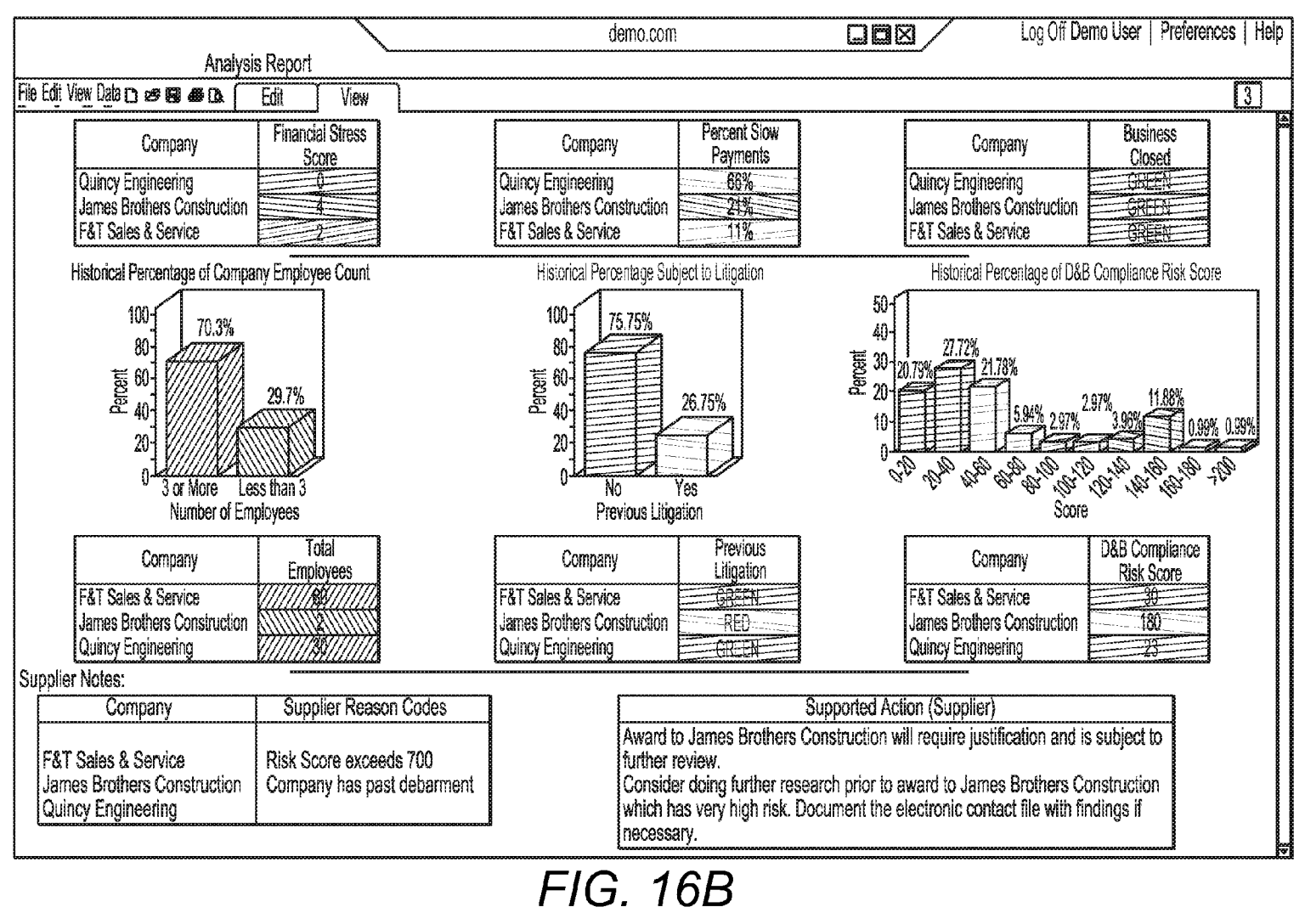

FIGS. 16A-16B show an example of a screenshot for a supplier risk drill down. Historical information for variables used in the supplier risk model are shown. Also, values for the variables for each company are also shown. For example, the variables are financial stress, slow payments, out of business, employee count, and subject to litigation. Scores may be color coded or other type of markings or techniques may be used to allow a user to quickly identify whether a score or risk may be problematic. Also, examples of notes and suggested actions are also shown.

Figure 17:
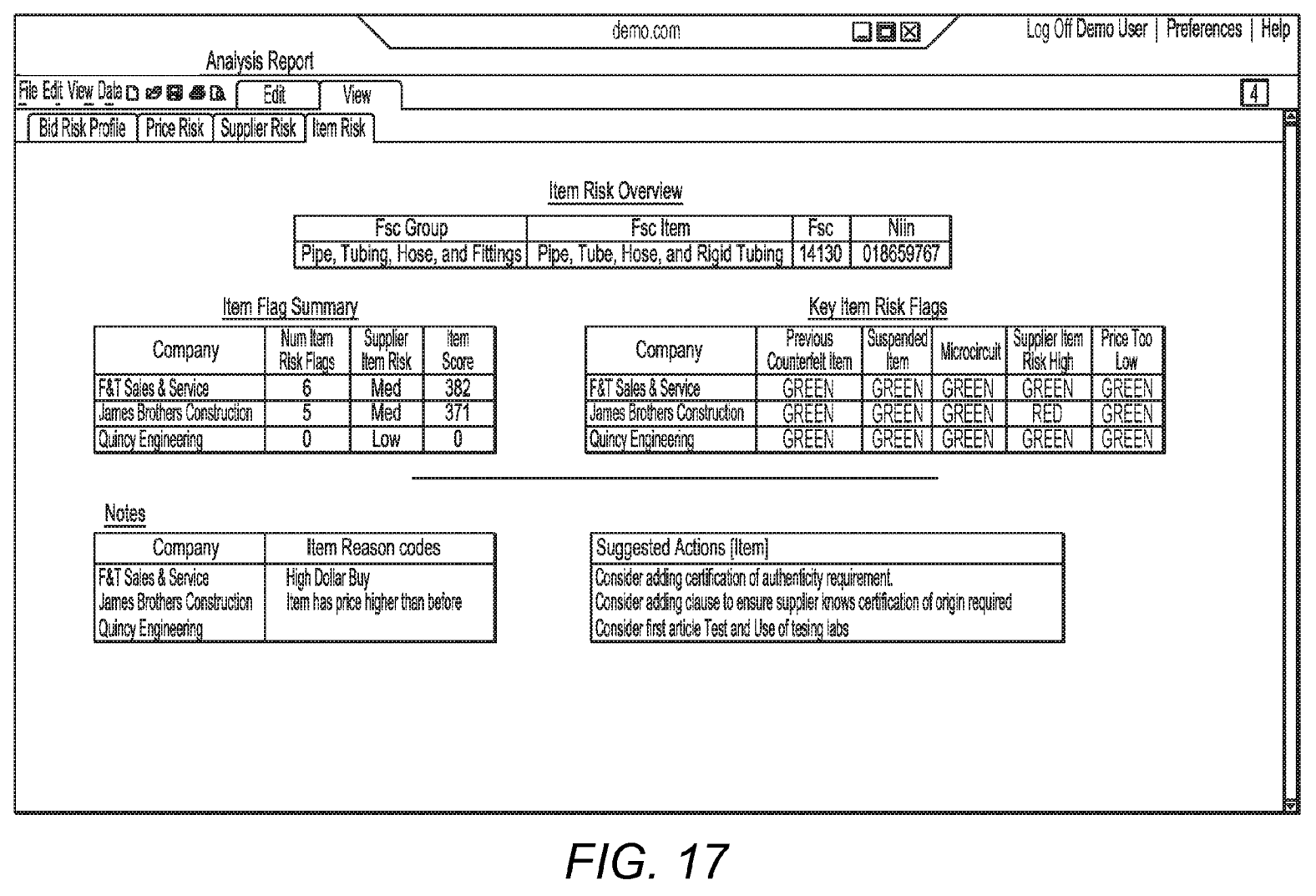

FIG. 17 shows an example of a screenshot for an item risk drill down. Examples of key flags are shown, which may represent variables in the item risk model. The key flags may be color coded to represent whether their values are ok or problematic. For example, a key flag that is determined to be a true risk condition is shown as red and a key flag that is determined not to be a true risk condition is shown as green. Also, examples of notes and suggested actions are shown.

As shown in FIG. 5 and discussed above with respect to FIG. 5, a procurement system 501 may interact with the system 502 to identify high-risk bids for procurements received through the procurement system 501. For example, bids in a feed of live procurement data are received at the system 502 from the procurement system 501. The system 502 may score the bids and identify high-risk procurements. For example, the system 502 generates information, such as a high-risk file identifying high-risk procurements, a procurement score file identifying scores for procurements, and metrics for the bids, and sends the information to the procurement system 501. The high-risk procurements identified in the high-risk file may be evaluated in a workflow executed by the procurement system 501 before the procurement process is closed. For example, procurements flagged as high-risk may be given further analysis using, for example, an audit workflow to determine whether they can be accepted or denied. The metrics 503 may be displayed via a GUI, e.g., a dashboard. FIGS. 18-22 describe procedures of the procurement process performed by the procurement system 501 and examples of interactions between the procurement system 501 and the system 502.

Figure 18:
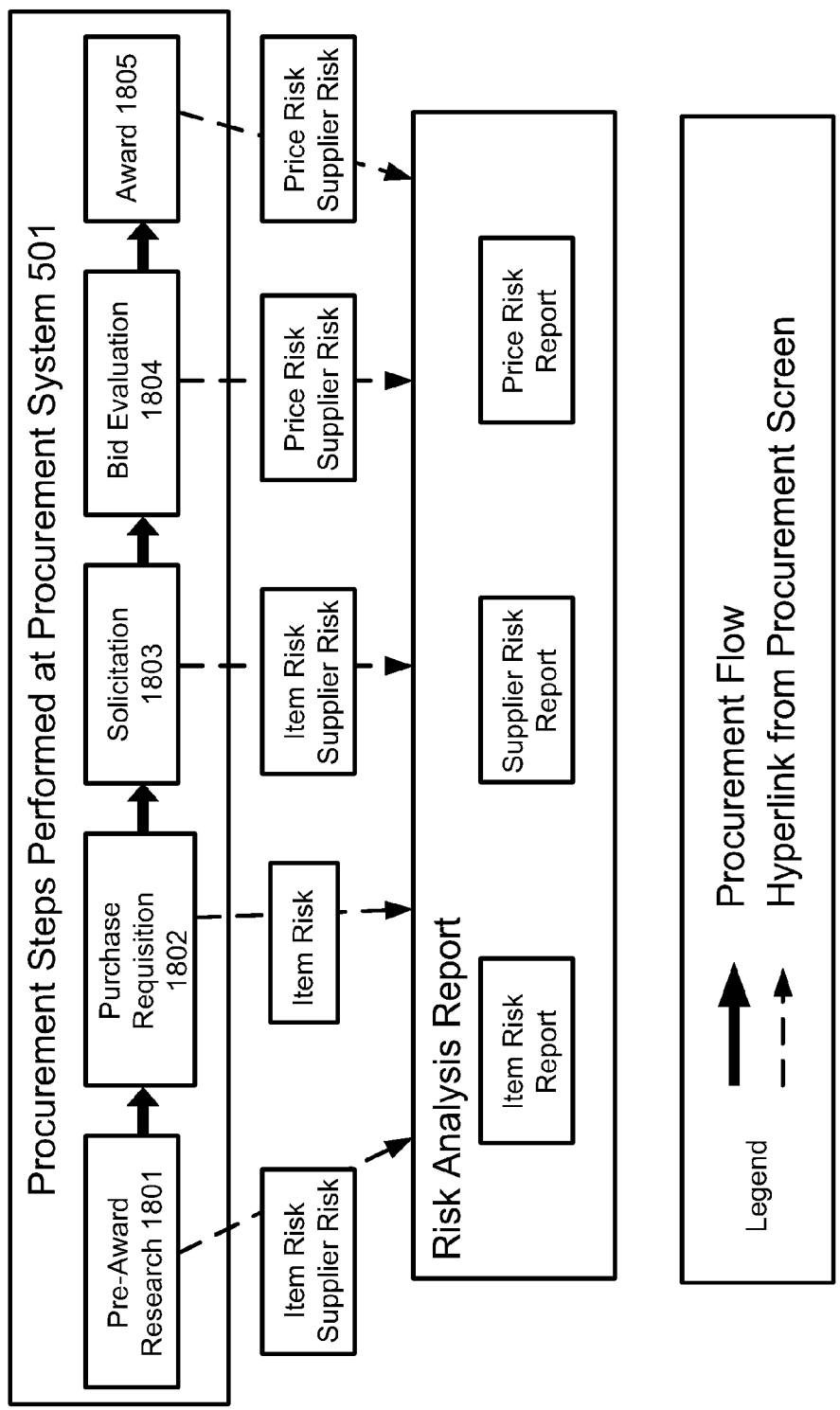
FIG. 18 shows a workflow for a procurement process, according to an embodiment.

FIG. 18 shows an example of a workflow for a procurement process, and information provided by the system 502 that may be used in steps of the workflow. At 1801, pre-award research may be performed through the system 501 before generating a request for bids to supply items. At 1802, a purchase requisition (PR) is generated that specifies the details for the procurement request for soliciting bids. At 1801-1802, item and supplier reports may be generated and accessed to aid in the procurement request generation. Item risk reports are now described and supplier risk reports are further described below. For example, during the early phases of procurement when a PR is created at 1801-1802, an item risk score is displayed, for example, in a dashboard of the procurement system 501. The item risk score may be provided by the system 502 by sending one or more items as data objects to the system 502 for determination of high-risk probabilities using the item risk model. The item risk score can be modified according to risk score thresholds to indicate a level of risk for the item (e.g. score range 70-100 is High Risk, 30-69 is Medium Risk, and 0-29 is Low Risk). The item risk score allows product specialists and planners to recognize the inherent riskiness of the item to be procured absent having to reference other sources, such as other lists, websites, or documentation, etc. For example, the item risk score allows a product specialist and/or planner to add notes to the PR to elaborate on aspects of the planned procurement, add extra precautions (such as clauses or statements), and/or take any other actions they see fit. The item risk score identifies items at risk of counterfeit or non-conformance before such items enter the supply chain where counterfeits or non-conforming parts have the potential to cause catastrophic failure of systems.

The item risk score displayed by the procurement system 501 may be hyperlinked to provide the end user with access to an item risk report, which may be self-populated without the user having to enter information (e.g. search criteria). The item risk report can display information regarding the item risk score as well as recommendations for actions that could change the workflow for the procurement specialist. Additionally, the recommendations may trigger requirements for overview and/or audit if there is a high risk determination. The item risk report also provides the user with a detailed report of metrics which combine information from multiple ones of the data sources 504. If the risk score raises a concern, the procurement specialist can view underlying data for the procurement via a drill-down to see what metrics may have led to that risk. Additionally, by automatically generating the item risk report using data relevant to the specific item being procured, the end user does not have to enter lookup information.

The item risk report may include a combination of data fields, data tables, and data visualizations customized to meet the objectives of the user. While some data will be a replication of relevant fields concatenated into one report, data visualization tools provide easy-to-read displays and visual comparisons of relevant data. Also, the data visualization tools can be used to plot relevant item risk data and provide the user with easy-to-read graphs for quick analyses of key information, and enables the user to spot trends more easily. Also, new graphs may be created with selectable options, e.g., selecting certain time periods, to instantly generate a new view.

At 1803, shown in FIG. 18, a solicitation comprised of procurement request may be generated and posted to solicit bids from suppliers, and at 1804, bids are received and evaluated, including evaluating bids for high-risk procurements, and evaluating bids to award a contract to one of the bidders at 1805. At steps 1803-1805, various reports may be accessed to aid in the evaluation process. The reports may include item risk reports, supplier risk reports and price risk reports for different steps, such as shown in FIG. 18. Item risk reports are described above. Price risk reports are now described. Price risk scores and accompanying confidence level indicators may be determined by the system 501 and provided to the system 502 for display during bid evaluation. During bid evaluation, a price risk score and confidence level indicator is generated for every bid submitted for consideration, and an accompanying price risk score and confidence level indicator is automatically generated displayed alongside the bid information. Additionally, when a procurement specialist launches a bid evaluation screen in preparation to make an award, the price risk scores and confidence level indicators are updated and appear alongside other relevant bid evaluation data.

The price risk score can assist in mitigating the risk of overpayments and identifies and flags bids such that procurement specialist or contracting officer can initiate suitable price negotiation procedures. In an example, the workflow of the procurement specialist and contracting officer is automatically modified to invoke price negotiation and other investigative procedures. Also, notifications may be generated for low bids, such as to alert to potential counterfeit/non-conforming items and/or investigate potential misunderstandings of the requirements. The confidence level indicators provide a single measure of both the availability of recent historical data and the price variance within the data. Having the price risk scores and confidence level indicators on-screen together allows for quick risk evaluation. Additionally, providing refreshed scores every time the bid evaluation screen is opened ensures the procurement specialist is always viewing scores produced from the most up-to-date data.

The system 501 may generate a price score hyperlink via a bid evaluation screen, and clicking the hyperlink causes a detailed price risk report to be displayed. Similar to the item risk report, the price risk report displays detailed information regarding the price risk score and recommendations for actions that could change the workflow for the procurement specialist. Additionally, the recommendations may trigger requirements for overview if there is a high risk. The price risk report also provides the user with a detailed report of metrics which combines information from multiple ones of the data sources 504. If the price risk score raises a concern, the procurement specialist can view the underlying data via a drill-down to see what metrics may have led to that risk. Additionally, by automatically generating the price risk report with data relevant to the specific item being procured, the end user does not have to enter lookup information.

Similar to the item risk report, the price risk report may include a combination of data fields, data tables, and data visualizations customized to meet the objectives of the user. While some data will be a replication of relevant fields concatenated into one report, data visualization tools provide easy-to-read displays and visual comparisons of relevant data. Also, the data visualization tools can be used to plot relevant price risk data and provide the user with easy-to-read graphs for quick analyses of key information, and enables the user to spot trends more easily. Also, new graphs may be created with selectable options, e.g., selecting certain time periods, to instantly generate a new view.

Supplier risk reports may be generated and accessed at various steps, such as shown in FIG. 18. For example, during solicitation and bid evaluation and possibly other steps and phases, supplier risk scores may be displayed. A supplier risk score may be generated for every supplier that submits a bid for consideration. When each new bid is received, an accompanying supplier risk score is generated and appears alongside the bid information. Additionally, when a procurement specialist launches their bid evaluation screen in preparation to make an award, the supplier risk scores are updated and appear alongside other relevant bid evaluation data. The supplier risk scores can be used to identify potentially high-risk suppliers, such as during bid evaluation. In this way, the supplier risk score can help reduce the number of bids awarded to suppliers who may provide counterfeit or non-conforming items; or who are unlikely not able to fulfill their contractual obligations.

Similar to the item risk and price risk reports, the system 501 may generate a supplier score hyperlink to access supplier risk reports and recommendations for actions that could change the workflow for the procurement specialist. Also, similar to the item risk and price risk reports, the supplier risk report may include a combination of data fields, data tables, and data visualizations customized to meet the objectives of the user.

Figure 19:
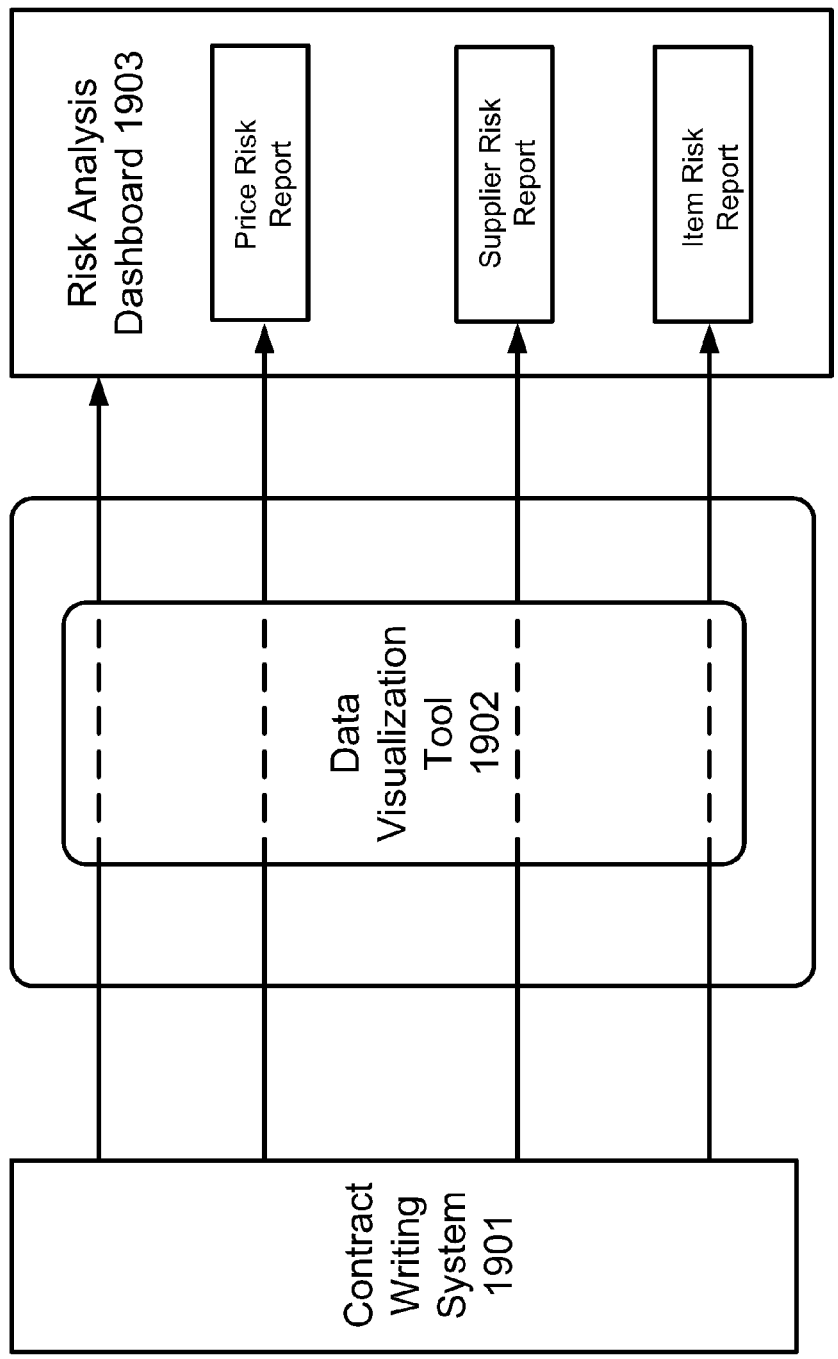
FIG. 19 shows components of a procurement system, according to an embodiment.

FIG. 19 shows an example of components of the procurement system 501. For example, the procurement system 501 may include a contract writing system 1901 that facilitates generating procurement requests and contracts to award. Data visualization tool 1902 may generate the hyperlinks described above during one or more of the steps shown in FIG. 18. For example, one or more of the steps shown in FIG. 18 may be performed while the user is entering or reviewing information for via the contract writing system 1901, and the data visualization tool 1902 may generate the hyperlinks clickable through the contract writing system 1901. Clicking the hyperlinks give access to the risk reports via risk analysis dashboard 1903, which includes a graphical user interface. The contract writing system 1901 may be part of the system 501 or may be an external software application that interacts with the contract writing system 1901. Also, the system 501 may include ad hoc risk report querying capability that allows end users to view risk reports outside of the typical procurement process. End users can access the querying capability to enter supplier, item or price lookup information. This allows end users to research items, suppliers and prices at any time and view relevant risk information.

Figure 20:
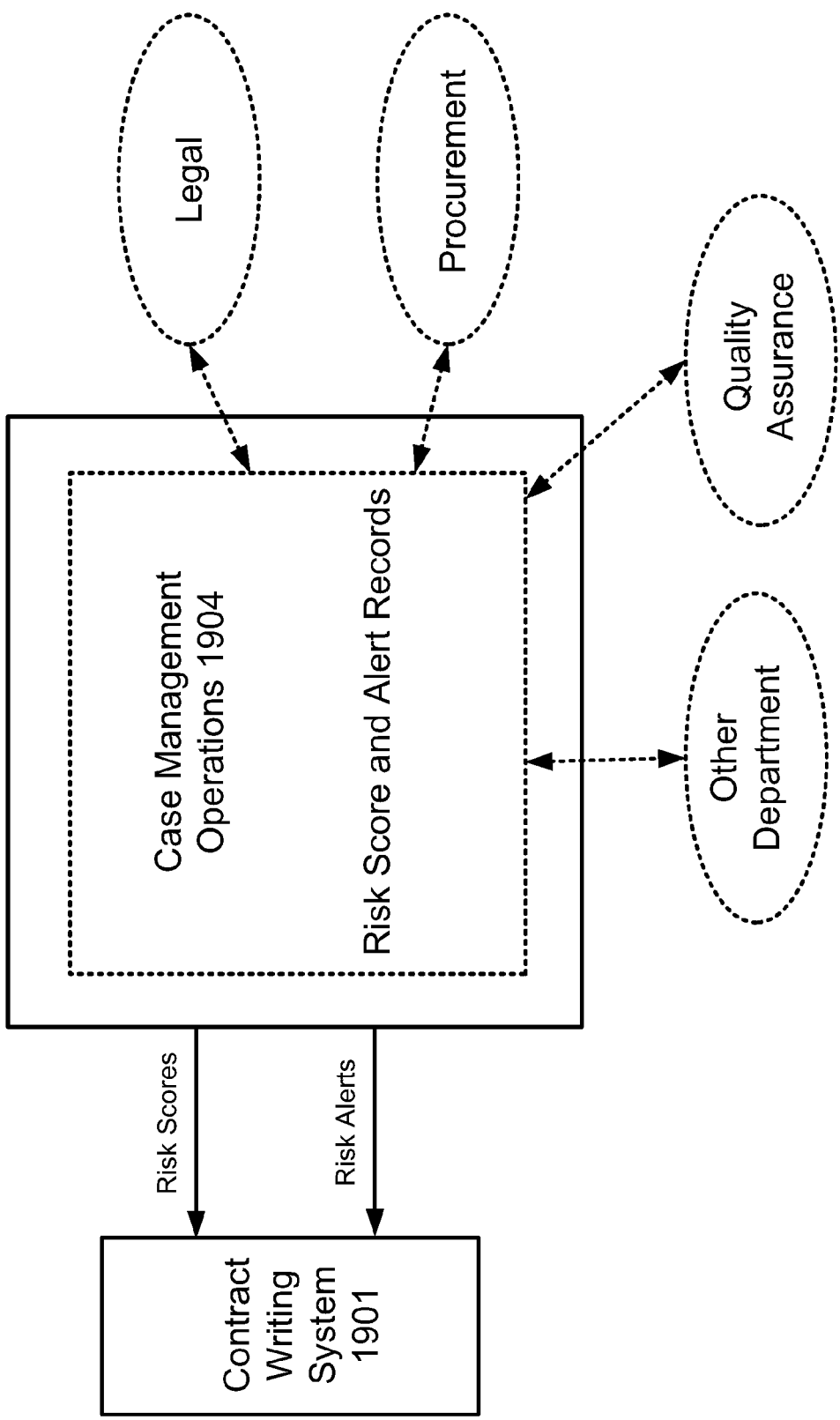
FIG. 20 shows case management operations, according to embodiments.

FIG. 20 shows examples of case management operations 1904 that may be performed by the procurement system 501 for risk evaluation. For example, risk score and alert records may be stored at the procurement system 501. The records, for example, can include risk scores, probabilities, and/or confidence indicators generated by the system 502 and/or the system 501 based on the models of the system 501. The records may also include indications of alerts that are generated to notify of high-risk items, suppliers and prices. The scores and alerts may be provided to the contract writing system 1901 and/or displayed in the dashboard 1903. Also, various departments, such as legal, procurement, quality assurance, and other departments may access the reports and scores and alerts through internal systems.

The case management operations 1904 may store risk scores and risk alerts, along with related metrics, so this information can be tracked and reported. Accordingly, the system 501 may operate as a central repository for risk scores and alerts, and risk trends over time can be identified. In response to identifying trends, suppliers may be excluded or other actions may be performed.

Also, one or more risk thresholds may be customizable in the system 501. For example, each risk score may have a customizable risk score threshold or tolerance which enables decision-makers to set a range of acceptable risk scores. The customizable thresholds also allow for custom categorization of risk scores such as "high", "medium", or "low" risk based on available data and scoring techniques. The thresholds may be customizable by administrators so that they can be modified to adapt to future changes or guidance.

Figure 21:
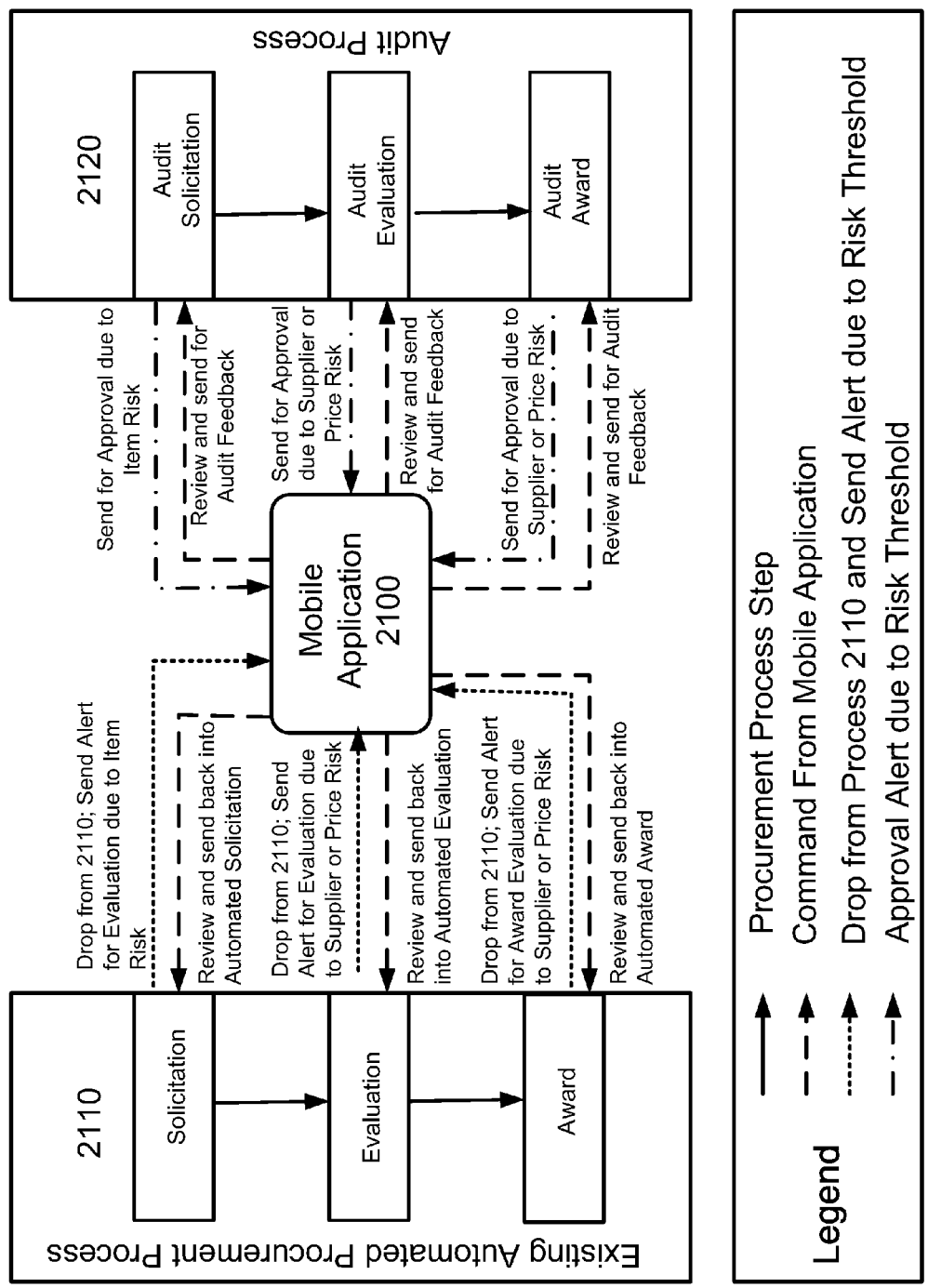
FIG. 21 shows a mobile application, according to an embodiment.

Referring now to FIG. 21, the system 501 may interact with a mobile application 2100 that executes on a mobile device to perform various operations associated with the workflow steps shown in FIG. 18. The alerts may be sent from the procurement system 501 to mobile devices of supervisors or contracting officers for immediate review and action. The mobile application 2100 accompanying this capability allows supervisors to review procurement details, approve/reject contracting steps, and move procurements between automated processes and other processes, such as audit processes. For example, an automated workflow executed by the system 501 includes performance of steps for solicitation, evaluation and contract awarding, such as shown at 2110 in FIG. 21. In certain instances, such as due to item, supplier or price risk alerts, an interrupt is generated to halt the workflow until audit feedback is received concerning an alert. The alerts may be generated in response to the classifiers 106 identifying high risk suppliers, items or prices in bids. For example, the automated workflow is halted, and the alert is sent to the mobile application 2100. The mobile application 2100 may send a command to trigger an audit and/or may directly cause the audit to be performed. For example, when mobile application 2100 triggers an audit one or more of the audit operations shown at 2120 may be performed in response to the alert. The mobile application 2100 may receive an approval alert or notification in response to sending the command if the bid is approved based on an audit operation performed at 2120. If the audit operation indicates that no adverse action should be taken, a command may be sent back to the system 501 to re-start the workflow. If the audit operation indicates that an adverse action, such as rejecting a bid, should be taken, then the bid may not be accepted. As seen in FIG. 21, the mobile application 2100 facilitates transitioning between automated and audit workflows based on item, supplier, or price risk alerts.

The mobile application 2100 also allows supervisors or contracting officers to set custom alerts applicable to specific criteria such as certain items, suppliers, quantities, etc. This allows personnel to remain informed about procurements in real-time and to provide them with the ability to react to procurement risks using system 501 before procurement specialists make the award. This mobile application 2100 also facilitates performance of operations described with respect to FIG. 18 from mobile devices.

Figure 22:
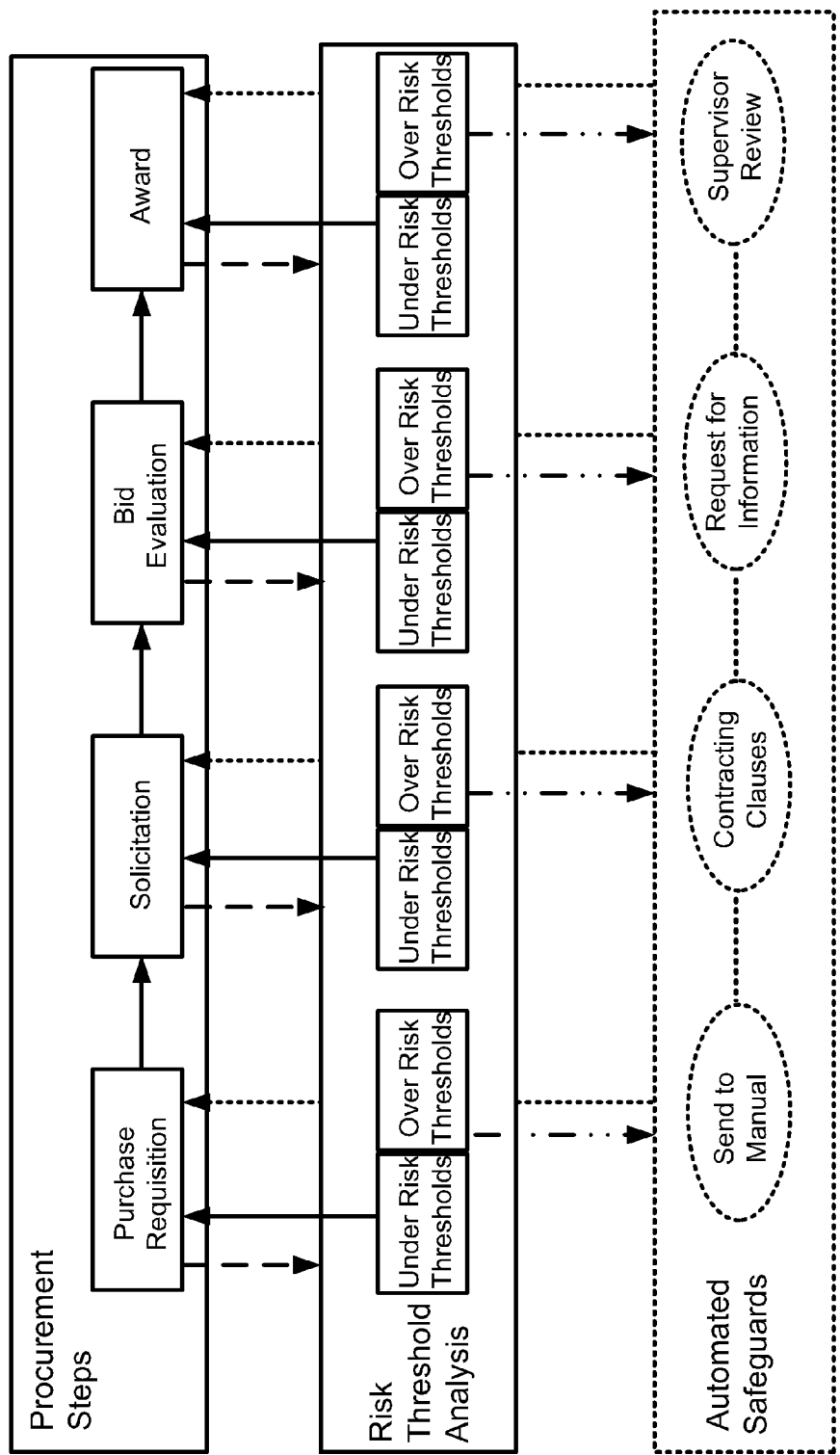
FIG. 22 shows automated safeguards that may be implemented in response to alerts for item, price and supplier risks, according to an embodiment.

FIG. 22 shows examples of automated safeguards that may be implemented in response to alerts for item, price and supplier risks. For example, if an item, price or supplier score exceeds a risk threshold, certain automated safeguards are executed by the system 501 depending on the current step of the procurement process. For example, during purchase requisition, an audit may be required, and may be initiated through the mobile application 2100 as shown in FIG. 21. During generation of the procurement request, as part of the bid solicitation, additional contracting safeguards may be automatically added by the contract writing system 1901 if a risk threshold is exceeded. The addition of automatic contracting clauses can provide automated risk mitigation, which allows the procurement organization to be sure they are protected when purchasing potentially risky items or dealing with potentially risky suppliers. Additional contracting clauses may also dissuade fraudulent suppliers from bidding on contracts when such provisions included. Finally, these additional safeguards may also provide the procurement agency with a legal means of recouping lost value when counterfeit or non-conforming parts are identified. Another example of an automated safeguard, such as during bid evaluation, may include automatic generation and sending of a request for additional information to the bidder if a threshold is exceeded, and during contact award, supervisor review may be initiated. These and other safeguards may be automatically executed in response to scores exceeding a threshold.

While the embodiments have been described with reference to examples, those skilled in the art will be able to make various modifications to the described embodiments without departing from the scope of the claimed embodiments.

What is claimed is:

1. A machine learning classifier system comprising:
   a data set processing subsystem to:
      generate a training set from a plurality of data sources, and
      a validation set from the plurality of data sources,
      wherein to generate the training set and the validation set, the data set processing subsystem is to:
         store a historic data set comprised of historic data received from a data source;
         retrieve additional data from at least one other data source that is associated with the historic data;
         store the additional data with the historic data; and
         partition the stored historic data and the additional data into the training set and the validation set, wherein the training set and the validation set comprise historic procurement data including bids having at least one of a high-risk item, a high-risk supplier, and a high-risk price to supply goods,
         wherein the data set processing subsystem is to filter the stored historic data and the additional data according to data scarcity and variation prior to partitioning the stored historic data and the additional data into the training set and the validation set,
         wherein the training set comprises a supervised training set of data objects from the stored historic data and additional data, and
         wherein the data objects in the supervised training set include labels indicating whether each data object belongs to a particular category;
   classifier hardware to:
      induce a classifier according to the training set, and
      test the classifier according to the validation set;
   a buffer connected to the classifier hardware to:
      store data objects to be classified, wherein the data objects to be classified comprise data objects in at least one of the training set, the validation set, and procurement data for new bids to supply goods, and the classifier hardware is to determine classifications of the data objects in the buffer, wherein the classifications comprise whether the data objects from the buffer include a high-risk item or not, whether the data objects from the buffer include a high-risk supplier or not, or whether the data objects from the buffer include a high-risk price or not;
   a register connected to the classifier hardware to:
      store the classifications of the data objects from the buffer; and
   a hardware processor to display, on a graphical user interface, the classifications stored in the register.

2. The machine learning classifier system of claim 1, wherein to retrieve additional data from at least one other data source, the data set processing subsystem is to:
   generate a query based on data in the historic data received from the data source; and
   execute the query on the at least one other data source to retrieve the additional data from the at least one other data source.

3. The machine learning classifier system of claim 1, wherein the data set processing subsystem is to execute transformation operations on fields in the stored historic data and additional data prior to partitioning the stored historic data and additional data into the training set and the validation set.

4. The machine learning classifier system of claim 1, wherein the data set processing subsystem is to:
   perform factor analysis on the stored historic data and additional data to determine multicollinearity between variables; and
   combine variables determined to be multicollinear into single variable.

5. The machine learning classifier system of claim 1, wherein the induced classifier comprises an ensemble classifier comprising a combination of a decision tree function, a multicollinearity function, a predictive strength analysis function, and a machine learning logistic regression function, wherein predictive variables are determined from the decision tree function, the multicollinearity function, and the predictive strength analysis function, and the predictive variables are used in the training set and the validation set to generate the ensemble classifier according to the machine learning logistic regression function.

6. A non-transitory computer readable medium comprising machine readable instructions executable by computing hardware to:
   store a historic data set comprised of historic data received from a data source;
   retrieve additional data from at least one other data source that is associated with the historic data;
   store the additional data with the historic data;
   perform factor analysis on the stored historic data and additional data to determine multicollinearity between variables;
   combine variables determined to be multicollinear into a single variable;
   generate a supervised training set of data objects from the stored historic data, the additional data and the single variable, wherein the supervised training set comprises labels for each of the data objects indicating whether each data object belongs to a particular category, and the supervised training set comprises historic procurement data including bids having at least one of a high-risk item, a high-risk supplier, and a high-risk price to supply goods;
   apply the supervised training set to one or more machine learning functions to induce a classifier;
   test the classifier on a validation set of data objects;

store data objects to be classified, wherein the data objects to be classified comprise procurement data for new bids to supply goods;

apply the tested classifier to classify the stored data objects, wherein the classifying comprises determining whether the stored data objects include a high-risk item or not, whether the stored data objects include a high-risk supplier or not, or whether the stored data objects include a high-risk price or not; and display, on a graphical user interface, classifications determined by the tested classifier applied to classify the stored data objects.

7. The non-transitory computer readable medium of claim 6, wherein to retrieve additional data from at least one other data source, the machine readable instructions executable by the hardware are to:

generate a query based on data in the historic data received from the data source; and execute the query on the at least one other data source to retrieve the additional data from the at least one other data source.

8. The non-transitory computer readable medium of claim 6, wherein the machine readable instructions executable by the hardware are to:

filter the stored historic data and the additional data according to data scarcity and variation.

9. The non-transitory computer readable medium of claim 6, wherein the machine readable instructions executable by the hardware are to:

execute transformation operations on fields in the stored historic data and the additional data.

10. The non-transitory computer readable medium of claim 6, wherein the induced classifier comprises an ensemble classifier comprising a combination of a decision tree function, a multicollinearity function, a predictive strength analysis function, and a machine learning logistic regression function, wherein predictive variables are determined from the decision tree function, the multicollinearity function, and the predictive strength analysis function, and the predictive variables are used in the training set and the validation set to generate the ensemble classifier according to the machine learning logistic regression function.

11. A machine learning classifier system to classify procurement data generated by a procurement system, the system comprising:

a data set processing subsystem to generate training sets and validation sets from historic procurement data comprised of bids having at least one of a high-risk item, a high-risk supplier, and a high-risk price to supply goods to supply goods or services;

classifier hardware to induce classifiers according to the training sets and test the classifiers according to the validation sets, wherein at least one of the classifiers comprises an ensemble classifier comprising a combination of a decision tree function, a multicollinearity function, a predictive strength analysis function, and a machine learning logistic regression function, wherein predictive variables are determined from the decision tree function, the multicollinearity function, and the predictive strength analysis function, and the predictive variables are used in at least one of the training sets and at least one of the validation sets to generate the ensemble classifier according to the machine learning logistic regression function;

a buffer connected to the classifier hardware to store data objects to be classified, wherein the data objects comprise data objects in at least one of the training set, the validation set, and procurement data for new bids to supply goods, and, wherein the classifiers classify the data objects in the buffer, wherein classifications of the data objects in the buffer determined by the classifiers comprise whether the data objects from the buffer include a high-risk item or not, whether the data objects from the buffer include a high-risk supplier or not, or whether the data objects from the buffer include a high-risk price or not; and a hardware processor to display, on a graphical user interface, the classifications of the data objects in the buffer.

12. The machine learning classifier system of claim 11, comprising at least one processor to:

determine a price risk score, a supplier risk score, and an item risk score based on the classifications performed by the classifiers, wherein each score is on the same scoring scale; and compare the scores to a respective threshold to determine if any of the bids are associated with a high-risk procurement.

13. The machine learning classifier system of claim 11, wherein the data set processing subsystem is to partition the historic procurement data and associated procurement data to generate the training sets and the validations sets.

* * * * *